US012719539B2

(12) United States Patent
Zhang et al.

(10) Patent No.: US 12,719,539 B2
(45) Date of Patent: Aug. 25, 2026

(54) CHANNEL STATE INFORMATION TRIGGERING AND REPORTING

(71) Applicant: QUALCOMM Incorporated, San Diego, CA (US)

(72) Inventors: Yu Zhang, San Diego, CA (US); Lei Xiao, San Jose, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 701 days.

(21) Appl. No.: 17/997,415

(22) PCT Filed: Jun. 15, 2020

(86) PCT No.: PCT/CN2020/096109
§ 371 (c)(1),
(2) Date: Oct. 28, 2022

(87) PCT Pub. No.: WO2021/253161
PCT Pub. Date: Dec. 23, 2021

(65) Prior Publication Data

US 2023/0198593 A1 Jun. 22, 2023

(51) Int. Cl.
*H04B 7/06* (2006.01)
*H04W 76/20* (2018.01)

(52) U.S. Cl.
CPC ......... *H04B 7/0626* (2013.01); *H04B 7/0632* (2013.01); *H04W 76/20* (2018.02)

(58) Field of Classification Search
CPC .... H04B 7/0626; H04B 7/0632; H04W 76/20
See application file for complete search history.

(56) References Cited

U.S. PATENT DOCUMENTS 9,155,098 B2 10/2015 Geirhofer et al.
9,337,954 B2 5/2016 Abraham et al.
(Continued)

FOREIGN PATENT DOCUMENTS

CN 105323041 A 2/2016
CN 109155714 A 1/2019
(Continued)

OTHER PUBLICATIONS

Huawei, et al., "CSI Acquisition Framework", 3GPP TSG RAN WG1 Meeting #88bis, R1-1704226, Spokane, USA, Apr. 3, 2017-Apr. 7, 2017, 8 Pages, Mar. 25, 2017.
(Continued)

*Primary Examiner* — Siming Liu
(74) *Attorney, Agent, or Firm* — QUALCOMM Incorporated

(57) ABSTRACT

Methods related to wireless communication systems and scheduling channel state information operations and transmissions. A user equipment (UE) receives, from a base station (BS), a channel state information (CSI) computation request. The UE then identifies a first CSI measurement resource based on the CSI computation request. The UE determines CSI based on the first CSI measurement resource, and receives, from the BS, a CSI report transmission request associated with the first CSI measurement resource. The UE optionally transmits to the BS a CSI report based on the first CSI measurement resource or a different CSI measurement resource. Other features are also claimed and described.

34 Claims, 9 Drawing Sheets

(56) References Cited

U.S. PATENT DOCUMENTS

| | | | | |
|---|---|---|---|---|
| 9,806,866 | B2 | 10/2017 | Hoshino et al. | |
| 2012/0177018 | A1 * | 7/2012 | Abraham | H04L 1/0027 370/328 |
| 2016/0037425 | A1 * | 2/2016 | Van Lieshout | H04B 7/024 370/332 |
| 2016/0337874 | A1 | 11/2016 | Yang et al. | |
| 2017/0332268 | A1 | 11/2017 | Yang et al. | |
| 2018/0324797 | A1 | 11/2018 | Hosseini et al. | |
| 2021/0167912 | A1 * | 6/2021 | Yamamoto | H04W 52/281 |
| 2021/0211913 | A1 * | 7/2021 | Takeda | H04W 24/10 |

FOREIGN PATENT DOCUMENTS

| | | | | |
|---|---|---|---|---|
| CN | 110474661 | A | 11/2019 | |
| EP | 3644523 | A1 | 4/2020 | |
| JP | 2019520732 | A | 7/2019 | |
| WO | 2012015737 | A1 | 2/2012 | |
| WO | 2018211821 | A1 | 11/2018 | |
| WO | WO-2019053340 | A1 * | 3/2019 | H04W 72/23 |
| WO | 2019087340 | A1 | 5/2019 | |
| WO | 2019215956 | A1 | 11/2019 | |
| WO | 2020007486 | A1 | 1/2020 | |

OTHER PUBLICATIONS

Intel Corporation: “Remaining Issues on CSI Reporting”, 3GPP TSG RAN WG1 #93, R1-1806506, Busan, South Korea, May 21-25, 2018, May 25, 2018 (May 25, 2018), pp. 1-12, Sections 2.1-2.2.

International Search Report and Written Opinion—PCT/CN2020/096109—ISA/EPO—Feb. 25, 2021.

Huawei, et al., “CSI Acquisition Framework”, 3GPP Draft, R1-1704226, 3GPP TSG RAN WG1 Meeting #88bis, 3rd Generation Partnership Project (3GPP), Mobile Competence Centre, 650, Route Des Lucioles, F-06921 Sophia- Antipolis Cedex, France, vol. RAN WG1. No. Spokane, USA, Apr. 3, 2017-Apr. 7, 2017, Mar. 25, 2017 (Mar. 25, 2017), XP051251035, 8 Pages, Section 3.2 section 3.4.1-3.4.2.

Supplementary European Search Report—EP20941069—Search Authority—The Hague—Feb. 15, 2024.

Taiwan Search Report—TW110117895—TIPO—Dec. 23, 2025.

* cited by examiner

CHANNEL STATE INFORMATION TRIGGERING AND REPORTING

CROSS-REFERENCE TO RELATED APPLICATIONS

The present application is a 35 U.S.C. 371 National Phase entry of Patent Cooperation Treaty (PCT) Application No. PCT/CN2020/096109, filed Jun. 15, 2020, which is hereby expressly incorporated herein by reference in its entirety.

TECHNICAL FIELD

The technology described below relates generally to wireless communication systems, and more particularly to channel state information triggering and reporting. Certain embodiments can enable and provide techniques allowing a base station to efficiently obtain channel state information from a user equipment (e.g., without unnecessarily blocking other uplink scheduling during channel state information computations).

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices (e.g., user equipment (UE)).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. As use cases and diverse deployment scenarios continue to expand in wireless communication, coding technique improvements may also yield benefits.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Some aspects of the present disclosure enable and provide mechanisms and techniques enabling a UE to determine and provide CSI to a BS at the request of the BS. For example, a UE can provide CSI reports without the BS allocating and scheduling uplink resources for a CSI report transmission when the BS requests CSI from a UE. This can allow the BS to schedule UEs to transmit other types of uplink data (e.g., ultra-reliable low latency communications (URLLC) data) after requesting for the CSI, but before scheduling the CSI report. Rather than simultaneously triggering the generation of a CSI report and scheduling uplink (UL) resources for transmission of the CSI report in a UL grant, a BS may instead divide the process into discrete steps. These steps may include triggering the generation of the CSI report by sending the UE a CSI computation request, and requesting the transmission of the CSI report by sending the UE a CSI report transmission request. The CSI computation request may cause the UE to determine CSI, but may not schedule any UL resources for transmission of the CSI report. The UE may store the CSI pending receipt of the CSI report transmission request. Once the CSI report transmission request is received by the UE, the UE may transmit the stored CSI report using the UL resources (e.g., resources in the physical uplink shared channel) specified by the BS.

For example, in an aspect of the disclosure, a method of wireless communication performed by a user equipment (UE) includes receiving, from a base station (BS), a channel state information (CSI) computation request. The method further includes identifying, based on the CSI computation request, a first CSI measurement resource. The method further includes determining CSI based on the first CSI measurement resource, and receiving, from the BS after the CSI computation request, a CSI report transmission request associated with the first CSI measurement resource.

In another example, aspects may include a wireless communication method for providing channel state information. The method may include determining channel state information based on one or more CSI measurement resources (e.g., first, second, third, etc.). The method may also include receiving or transmitting a CSI report. Receipt or transmission of the CSI report may be preceded by a CSI report request in some scenarios. The method may also optionally include receiving a CSI computation request and/or identifying a first CSI measurement resource. The first CSI measurement resource can be based on a CSI computation request.

In an additional aspect of the disclosure, a method of wireless communication performed by a BS includes transmitting, to a UE, a CSI computation request. The method further includes transmitting, to the UE, a CSI report transmission request associated with a first CSI measurement resource. The method further includes receiving, from the UE in response to the CSI report transmission request, a CSI report associated with the first CSI measurement resource.

In an additional aspect of the disclosure, a UE includes a processor and a transceiver. The transceiver is configured to receive, from a BS, a CSI computation request. The processor is configured to identify, based on the CSI computation request, a first CSI measurement resource, and determine CSI based on the first CSI measurement resource. The transceiver is further configured to receive, from the BS after the CSI computation request, a CSI report transmission request associated with the first CSI measurement resource.

In an additional aspect of the disclosure, a BS includes a processor and a transceiver. The transceiver is configured to transmit, to a UE, a CSI computation request. The transceiver is further configured to transmit, to the UE, a CSI report transmission request associated with a first CSI measurement resource, and receive, from the UE in response to the CSI report transmission request, a CSI report associated with the first CSI measurement resource.

In an additional aspect of the disclosure, a non-transitory computer-readable medium having program code recorded thereon. The program code includes code for causing a UE to receive, from a BS, a CSI computation request. The program code further includes code for causing the UE to identify, based on the CSI computation request, a first CSI measurement resource. The program code further includes code for causing the UE to determine CSI based on the first CSI measurement resource. The program code further includes code for causing the UE to receive, from the BS after the CSI computation request, a CSI report transmission request associated with the first CSI measurement resource In an additional aspect of the disclosure, a non-transitory computer-readable medium having program code recorded thereon. The program code includes code for causing a BS to transmit, to a UE, a CSI computation request. The program code further includes code for causing the BS to transmit, to the UE, a CSI report transmission request associated with a first CSI measurement resource. The program code further includes code for causing the BS to receive, from the UE in response to the CSI report transmission request, a CSI report associated with the first CSI measurement resource.

In an additional aspect of the disclosure, a UE includes means for receiving, from a BS, a CSI computation request. The UE further includes means for identifying, based on the CSI computation request, a first CSI measurement resource. The UE further includes means for determining CSI based on the first CSI measurement resource. The UE further includes means for receiving, from the BS after the CSI computation request, a CSI report transmission request associated with the first CSI measurement resource.

In an additional aspect of the disclosure, a BS includes means for transmitting, to a UE, a CSI computation request. The BS further includes means for transmitting, to the UE, a CSI report transmission request associated with a first CSI measurement resource. The BS further includes means for receiving, from the UE in response to the CSI report transmission request, a CSI report associated with the first CSI measurement resource.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
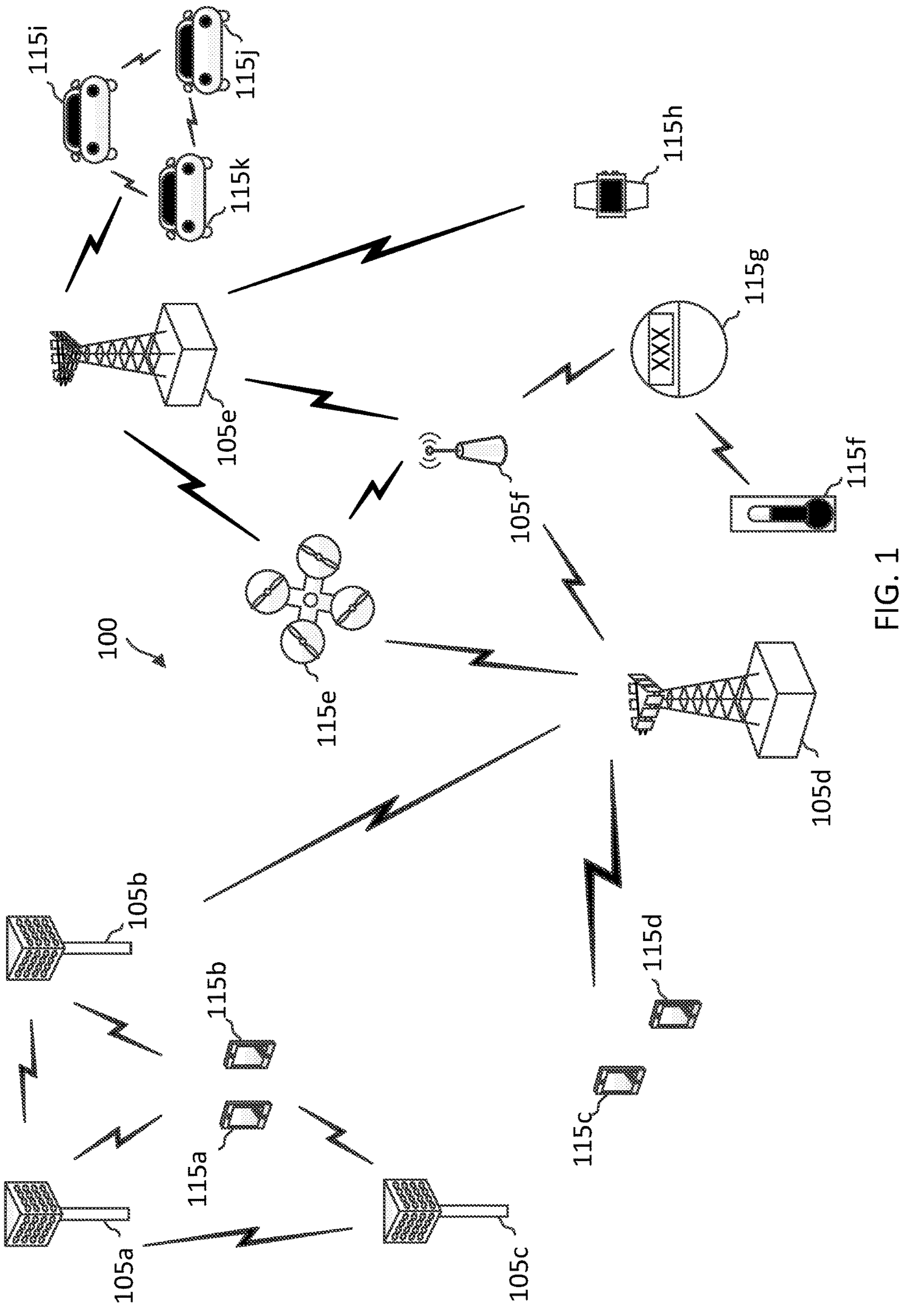
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

A base station (BS) may request channel state information (CSI) from a UE to determine the current state of the channel for communication between the BS and the UE based on CSI measurement resources. The CSI measurement resources may be, for example, a non-zero power channel state information reference signal (NZP CSI-RS) and/or a channel state information interference measurement (CSI-IM) resource. A BS may send a single physical downlink control channel (PDCCH) downlink control information (DCI) to request the UE to measure and/or collect CSI from the associated CSI measurement resources and to schedule uplink resources for the UE to transmit the resulting CSI report. Uplink scheduling is typically pre-booked (transmitted ahead of the actual scheduled time). Because CSI computation at the UE may take a substantial amount of time, the BS may account for the CSI computation time and transmit the DCI (including the CSI measurement and reporting trigger) at an even earlier time than the CSI reporting scheduled resource, for example, up to about 11 slots in advance depending on the subcarrier spacing. As such, there may be a substantially long duration between the time the CSI request is transmitted to the UE and the CSI reporting scheduled resource. Since uplink scheduling is expected to be in-order, the BS may not schedule the UE with another uplink transmission between the time the UE receives the CSI request and the time the UE transmits the CSI report. This effectively gives CSI data a higher priority than other types of data, making ultra-reliable low latency communications (URLLC) difficult for the UE.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/$km^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~0.99.9999% reliability), ultra-low latency (e.g., ~1 ms), and users with wide ranges of mobility or lack thereof; and (3) with enhanced mobile broadband including extreme high capacity (e.g., ~10 Tbps/$km^2$), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI). Additional features may also include having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing (SCS), may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

A base station (BS) in 5G NR may request channel state information from a user equipment (UE). A BS can use CSI to determine operating conditions or state of a channel to aid communication between the BS and the UE and/or to obtain interference measurements. The BS may request that the UE perform channel estimation and/or interference measurement by including an aperiodic channel state information (A-CSI) trigger as part of an uplink (UL) grant to the UE. The UL grant with the trigger may be sent in a physical downlink control channel (PDCCH) transmission, and the grant may include a UL scheduling offset indicating the number of slots between when the grant is transmitted and when the UE is scheduled to transmit a CSI report in the physical uplink shared channel (PUSCH). The UL grant may be followed by the presence of a channel state information reference signal (CSI-RS) and/or the presence of a channel state information interference measurement (CSI-IM) resource. When a UL grant includes an A-CSI trigger (e.g., indicated by a CSI trigger field with a non-zero value), the scheduling offset is greater than for a UL grant not associated with an A-CSI trigger, to account for the time the UE takes to prepare the requested CSI report.

Currently, out-of-order PUSCH transmissions are prohibited, so the BS may not schedule the UE to transmit any PUSCH data during the scheduling offset (i.e., before the UE is scheduled to transmit the requested CSI report). In addition to the resulting inefficiency, CSI data is effectively given a higher priority than other types of uplink data, which may be problematic for ultra-reliable low latency communication (URLLC). Thus, aspects and embodiments described herein provide techniques that allow and enable a BS to request CSI without the BS allocating and scheduling uplink resources for a CSI report when it requests the CSI. This may allow the BS to schedule the UE to transmit other types of uplink data (e.g., URLLC data) after requesting for the CSI request, but before scheduling the CSI, satisfying in-order PUSCH transmission scheduling. report.

The present disclosure provides techniques for a UE to determine and provide CSI to a BS. In some scenarios, a UE may provide CSI to a BS at the request of the BS. UE provision of CSI may occur without the BS reserving uplink resources for a CSI report when it requests the CSI. This may allow the UE to transmit other types of uplink data (e.g., URLLC data) after receiving the request for CSI, but before transmitting the CSI report. Rather than simultaneously triggering generation of a CSI report and scheduling UL resources for transmission of the CSI report in a UL grant, a BS may instead divide the process into discrete steps. These steps can include triggering generation of the CSI report by sending the UE a CSI computation request, and requesting the transmission of the CSI report by sending the UE a CSI report transmission request. The BS may transmit the CSI computation request as a downlink control information (DCI) message in the PDCCH (referred to herein as a compute-only DCI). Additionally or alternatively, a BS can, at a later time, transmit a CSI report transmission request as part of a DCI message in the PDCCH (referred to herein as a report-only DCI). A compute-only DCI can trigger generation of the CSI report by the UE. But, in some instances, doing so would not schedule any UL resources for transmission of the CSI report. The UE may generate the CSI report and store it, pending receipt of the report-only DCI. Once the report-only DCI indicating which CSI report to transmit is received by the UE, the UE may transmit the stored CSI report using the UL resources (e.g., resources in the physical uplink shared channel (PUSCH)) specified in the report-only DCI. In an example, the report-only DCI includes a CSI request field including a value that maps to a CSI triggering state. The CSI triggering state may be associated with one or more CSI report configurations. Each CSI report configuration may reference a CSI measurement resource the BS is requesting for the report.

For example, according to aspects of the present disclosure, a BS may request that a UE compute CSI by transmitting to the UE a first CSI computation request (e.g., as a DCI message in the PDCCH). The first CSI computation request may indicate one or more CSI measurement resources on which the UE may measure the CSI, but may not indicate any resources for transmission by the UE of the CSI report. Based on the first CSI computation request, the UE may then identify a CSI measurement resource, which may be, for example, a channel state information reference signal (CSI-RS) resource and/or a channel state information interference measurement (CSI-IM) resource. Based on the CSI measurement resource(s), the UE may perform channel estimation and/or interference measurement, but rather than immediately transmitting the result to the BS, the UE may store the resulting CSI in memory within the UE. During the CSI computation time, the BS may schedule the UE for other types of uplink data (e.g., URLLC data) by transmitting a scheduling grant to the UE and the UE may transmit uplink data based on the scheduling grant. At a later time, the BS may transmit a first CSI report transmission request to the UE (e.g., as a DCI message on the PDDCH), requesting the UE to transmit a report including the CSI it computed in response to the first CSI computation request. The CSI report transmission request may indicate which uplink resources (e.g., PUSCH resources) the UE should use for transmitting the report.

In some aspects, the UE may keep multiple CSIs stored in its memory corresponding to different CSI computation requests and CSI measurement resource. For example, some time after transmitting the first CSI computation request, the BS may transmit a second CSI computation request and indicate a second CSI measurement resource corresponding to the second CSI computation request. The UE may perform channel and/or interference measurement based on the second CSI measurement resource and store the resulting CSI in memory without removing the CSI corresponding to the first CSI computation request. The UE may store and maintain multiple CSIs in its memory, which may be useful, for example, if the gap between a CSI computation request and a CSI report transmission request is too short for the UE to determine CSI. In those circumstances, it may be appropriate for the UE to transmit an older, stored CSI. In some aspects, there may be a limit to the number of CSIs the UE may store, and the UE may delete a stored CSI or not store newly computed CSI if the number of CSIs in memory exceeds the limit.

In some aspects, the UE may employ a timer to determine which, if any, stored CSI to transmit to the BS in response to the CSI transmission request. The timer mechanism may aid the UE in responding to CSI report transmission requests that arrive too early (e.g., before the UE has been able to determine the CSI) or too late (e.g., when the CSI data has become stale or out of date).

Aspects may include further timing-related features. For example, a UE may start (or reset) a timer after some period (or duration) has elapsed from the end time of the CSI measurement resource (e.g., the end of the last symbol of the CSI measurement resource). A period may be (approximately) the minimum gap between the end time of the CSI measurement resource and when the UE could have the CSI determined. Timer durations may be pre-configured (e.g., to a value defined in a 3rd Generation Partnership Project (3GPP) specification). Additionally or alternatively, timer values could be semi-statically configured by the BS (e.g., through RRC signaling) or dynamically indicated by the BS (e.g., as part of the CSI computation request, or via a MAC CE). The timer duration may be based on the information (e.g., the CSI report content) the UE is to include in the CSI report (e.g., the timer duration may be greater when the UE is to include more information or more complex information in the CSI report).

The timer duration may also be based on a codebook type, a number of antenna ports, a channel quality indicator (CQI) type, and/or a precoding matrix indicator (PMI) type associated with a CSI report. In general, the CSI report content may vary depending on the codebook type to be used for CSI computation, the number of antenna ports associated with the CSI measurement resource and/or the type of CQI and/or PMI is to be reported. In other words, the CSI computation time may vary depending on the CSI report content.

The period of time for which the timer is running may correspond to the period of time for which the current CSI report should be transmitted to the BS in response to receiving the CSI report transmission request. For example, if the CSI report transmission request arrives while the timer is running, the UE may transmit the most recently computed CSI in the CSI report. However, if the UE receives the CSI report transmission request before the timer has started, it may be that the UE has not been able to complete the requested channel estimation and/or interference measurement. If the CSI report transmission request is received after the timer has expired, it may indicate that the most-recently computed CSI data is now stale. In either case—when the CSI transmission request is received before the timer starts or after the timer is expired—the UE may transmit CSI which may not be current (e.g., the most recently stored—now stale—CSI, or a previously stored CSI and based on an older CSI computation request and corresponding CSI measurement resource) or placeholder data (with no useful CSI) in the CSI report. The transmission of the stale CSI or non-useful CSI is to satisfy the CSI report transmission request since the UE is to transmit as scheduled by the BS.

Transmitting an older CSI or placeholder data may be appropriate when, for example, the transmission on which the CSI report transmission request arrived also included a grant for transmitting uplink shared channel (UL-SCH) data or hybrid automatic repeat request (HARQ) acknowledgements. In that case, the BS may determine that the CSI report is not based on the most recent CSI computation request. Since the BS is aware of the timeline of the CSI computation request and the CSI report transmission request, the BS can determine whether the CSI report is valid or not. In general, the BS may not schedule the UE such that the CSI report transmission request is outside the period when the report timer of the UE is running. Alternately, the UE may ignore the CSI report transmission request altogether (i.e., refrain from transmitting a CSI report), for example, if the CSI transmission request only included a grant for transmitting the CSI report. In some aspects, the UE may remove a stored CSI from memory based on the timer expiring.

In some aspects, resource occupancy reporting rules may be updated to reflect aspects of the present disclosure. 5G NR provides rules for a UE to determine resources (e.g., the maximum number of central processing units (CPUs) and/or the maximum number of simultaneous memory resources) for implementing a two-step CSI trigger (with separate CSI computation request and CSI report transmission request) and to report its capability associated with the two-step CSI trigger. In accordance with the current disclosure, CPU resources are occupied from the end of the last symbol of the PDCCH (or control resource set (CORESET)) on which the CSI computation request (e.g., the compute-only DCI) is carried, for a duration of Z symbols, where Z is the minimum gap between the time when the CSI computation request is transmitted and the time when the UE can provide the CSI report. In other words, Z symbols is the amount of time to complete a CSI computation. The value of Z may vary depending on the capabilities of the UE. The UE may determine a value for Z based on the CPU resource occupancy rule and report the value for Z to the BS. For instance, a UE having a high processing capability may report a smaller Z value than a UE having a low processing capability. Memory resources may be occupied by the CSI operations from the end of the last symbol of the PDCCH (or control resource set (CORESET)) on which the CSI computation request (e.g., the compute-only DCI) is carried, for a duration of $Z+T_{exp}$ symbols, where Z is defined as above in relation to CPU occupancy and $T_{exp}$ is the duration of the window for which the UE waits for a CSI report transmission request (i.e., the timer duration discussed above, wherein the UE may provide the most recently computed CSI to the BS). Memory resources occupied for CSI operations become free at the expiration of the window, or after the UE transmits the CSI report to the BS (in response to receiving the CSI request report transmission during the window).

Aspects of the present disclosure can provide many benefits. For example, aspects of the present disclosure enable a BS to schedule a UE to transmit uplink data in a time period between receiving a request for CSI and transmitting the results of the request. This can occur, for example, by decoupling the A-CSI triggering mechanism from the UL resource allocation for reporting the CSI. This may enable a UE to better communicate URLLC data (e.g., with a lower latency), since the CSI data is no longer de-facto prioritized by having the UE locked into determining and transmitting the CSI without interruption.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

FIG. 1 illustrates a wireless communication network 100 according to some aspects of the present disclosure. The network 100 may be a 5G network. The network 100 includes a number of base stations (BSs) 105 (individually labeled as 105*a*, 105*b*, 105*c*, 105*d*, 105*e*, and 105*f*) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 may be dispersed throughout the wireless network 100, and each UE 115 may be stationary or mobile. UEs can take in a variety of forms and a range of form factors. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*h* are examples of various machines configured for communication that access the network 100. The UEs 115*i*-115*k* are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115*e*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-step-size configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such asV2V, V2X, C-V2X communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. The random access procedure (or RACH procedure) may be a single or multiple step process. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a backoff indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. Scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, a BS 105 may request that a UE 115 compute CSI by transmitting to the UE 115 a CSI computation request (e.g., as a DCI message in the PDDCH). The CSI computation request may indicate the presence of at least one CSI measurement resource on which the UE 115 shall perform the CSI measurement, but may not indicate any resources for transmission by the UE 115 of the CSI report. The UE 115 may then identify based on the to the CSI computation request, the CSI measurement resource. Based on the CSI measurement resource, the UE 115 may perform channel measurement and/or interference measurement, but rather than immediately transmitting the result to the BS 105, the UE 115 may store the resulting CSI in memory within the UE 115. Afterwards, the UE 115 may continue to transmit other types of uplink data (e.g., URLLC data). For example, the BS 105 may transmit a scheduling grant to the UE 115 and the UE 115 may transmit uplink data based on the scheduling grant. At a later time, the BS 105 may transmit a CSI report transmission request to the UE 115 (e.g., as a DCI message on the PDDCH), indicating that the UE 115 should now transmit a report including the CSI it computed based on the CSI measurement resource. The CSI report transmission request may indicate which uplink resources (e.g., PUSCH resources) the UE 115 should use when transmitting the report. Additionally, the CSI report transmission request may include a CSI request field including a value that maps to a CSI triggering state. The CSI triggering state may be associated with one or more CSI report configurations. Each CSI report configuration may reference a CSI measurement resource the BS is requesting for the report. For example, the CSI report transmission request may reference the same CSI measurement resource as the CSI computation request. Accordingly, the UE 115 may transmit the CSI report based on the CSI measurement resource indicated by the CSI report transmission request. Depending on the time when the CSI report transmission request is received, the UE 115 may transmit the CSI report based on the CSI measurement resource indicated by the CSI report transmission request, or based an earlier CSI measurement resource, depending on when the UE 115 receives the CSI report transmission request, as discussed with respect to FIGS. 4-5, 7, and 8. In some instances, the UE 115 may ignore the CSI report transmission request and refrain from transmitting a CSI report altogether (e.g., if the CSI report transmission request does not arrive while the timer is running, as described above).

Figures 2A, 2B:
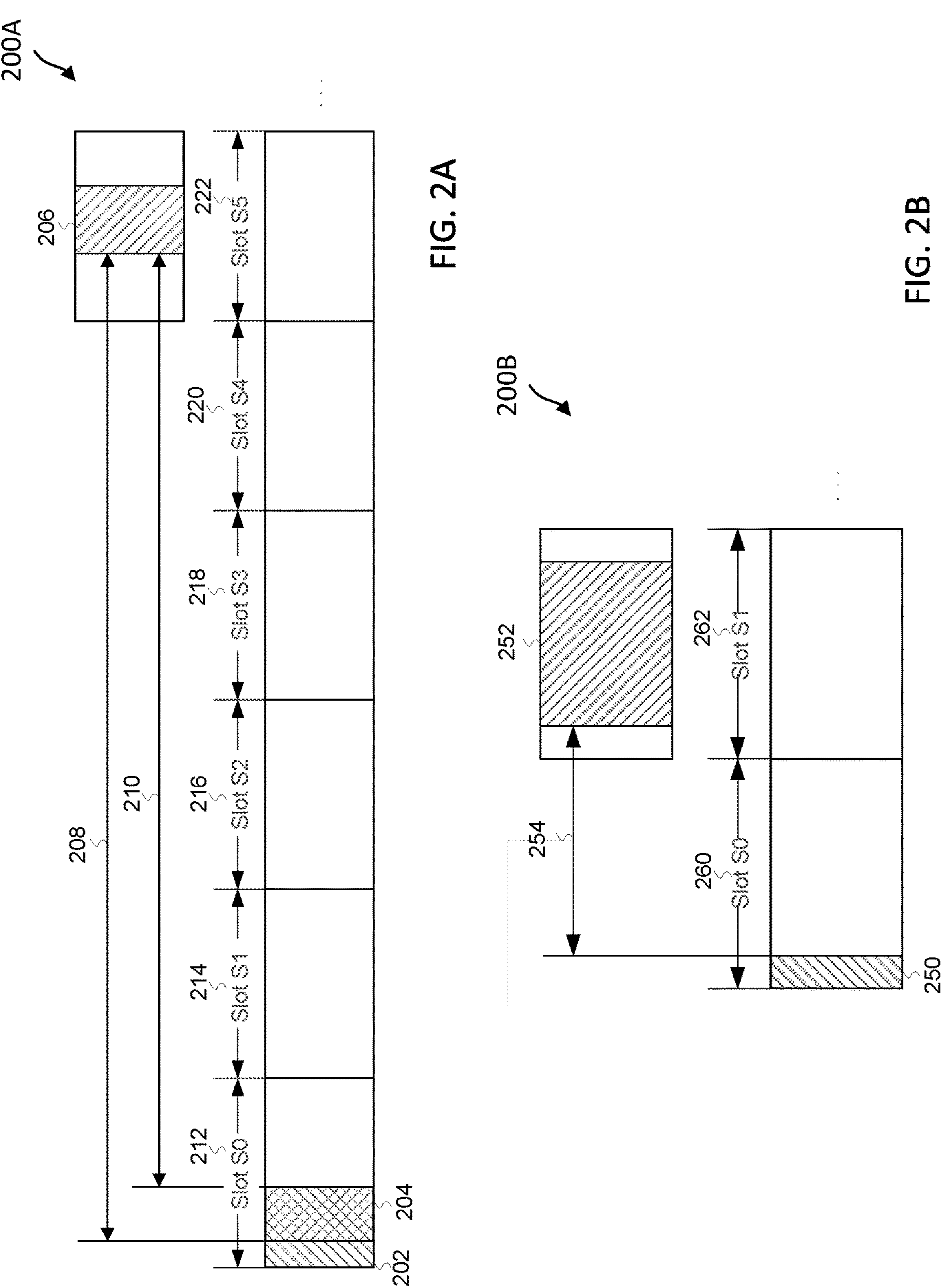
FIG. 2A illustrates a channel state information (CSI) request and resource allocation method according to some aspects of the present disclosure.
FIG. 2B illustrates a resource allocation method according to some aspects of the present disclosure.

FIG. 2A illustrates a CSI request and resource allocation method 200A according to some aspects of the present disclosure. When requesting CSI from a UE 115 using an aperiodic CSI request, a BS 105 may include an A-CSI trigger 202 (e.g., as part of DCI) in a PDCCH transmission during a slot S0 212. In an example, the DCI may include a CSI request field including a value that maps to a CSI triggering state. The CSI triggering state may be associated with one or more CSI report configurations. Each CSI report configuration may reference a CSI measurement resource the BS 105 is requesting for the CSI report. An uplink grant may be included along with an A-CSI trigger 202, indicating which UL resources 206 the UE 115 is to use in the PUSCH when transmitting the CSI report to the BS 105. The BS may indicate that the reported CSI may be based on a CSI measurement resource 204 (e.g., an NZP CSI-RS resource and/or a CSI-IM resource) reference by the A-CSI trigger 202. The CSI measurement resource is a set of resource elements (spanning a number of subcarriers in frequency and a number symbols in time) where the UE 115 may perform measurement. When the CSI measurement resource 204 is a CSI-RS or NZP CSI-RS resource, the BS 105 may transmit a CSI-RS in the CSI measurement resource 204 for the UE 115 to determine a channel response. When the CSI measurement resource 204 is a CSI-IM resource, the UE 115 may measure interference from the CSI measurement resource 204. The BS may indicate (e.g., as part of the uplink grant) a scheduling offset 208, which may be referred to as Y, indicating the gap between the time the A-CSI trigger is transmitted and the time the CSI report should be transmitted on the PUSCH. The BS 105 may have to pre-book the UL resources 206 a number of slots in advance (e.g., before transmitting the A-CSI trigger 202 in slot S0 212) and the BS 105 is expected to perform in-order uplink scheduling. As a result, from the end time of the CSI measurement resource 204 to the time the UE 115 transmits the CSI report on the UL resources 206, the BS 105 may not schedule the UE 115 to transmit any additional UL data during the gap time. The gap between the CSI measurement resource 204 and the CSI report being transmitted on the UL resources 206 (e.g., the PUSCH transmission) may be referred to Y'. For example, the BS 105 may not schedule the UE 115 to transmit any additional UL data for the remainder of slot S0 212, or slot S1 214, slot S2 216, slot S3 218, or slot S4 220. Thus, the UE 115 may not transmit other types of UL data until after transmitting the CSI report during slot S5 222. As a result, CSI data is effectively given higher priority than other types of data, which may be problematic for a UE 115 engaged in URLLC communication.

FIG. 2B illustrates a resource allocation method 200B according to some aspects of the present disclosure. In contrast to FIG. 2A, a UL grant 250—no A-CSI trigger—is included in the PDCCH transmission. Since the UE 115 is not occupied determining CSI, the UE 115 may transmit data using the UL resources 252 (e.g., on the PUSCH) much sooner after the UL grant 250 when compared to the method 200A. Here, UE 115 may transmit data on the UL resources 252 after a period $N_2$, defined as the gap 254 between the end of the PDCCH transmission (i.e., the UL grant 250) and the start of the scheduled UL resources 252 (e.g., the PUSCH). In this example, the UL grant 250 is received in slot S0 260, and the UE may transmit UL data in the next slot, slot S1 262.

As illustrated in FIGS. 2A and 2B, the scheduling offset between when a UL grant is transmitted and when the UE 115 may transmit data on the resources indicated by the UL grant depends on whether an A-CSI trigger is included along with the UL grant. If an A-CSI trigger 202 is included as in FIG. 2A, the minimum scheduling offset is Z symbols, which depends on the SCS used and the type of CSI to be determined (e.g., number of antenna ports and codebook type considered). Different types of CSI may have different computational complexity, and thus may have different computation time. For example, for high-latency CSI, Z may be set to $Z_2$ as illustrated in Table 1 below for various SCS values. The UE 115 may ignore the A-CSI trigger if the CSI computation timeline requirements are not met.

TABLE 1

| SCS (kHz) | $Z_2$ (Symbols) |
|---|---|
| 15 | 40 |
| 30 | 72 |
| 60 | 141 |
| 120 | 152 |

For low-latency CSI (e.g., wideband Type 1 CSI with up to 4 antenna ports), Z may be set to a smaller value than $Z_2$, but may still be substantially large (e.g., a long duration).

If no A-CSI trigger is included along with the UL grant, the minimum scheduling offset depends on the SCS and may be approximately $N_2$, as illustrated in Table 2 below for various SCS values.

TABLE 2

| SCS (kHz) | $N_2$ (Symbols) |
|---|---|
| 15 | 10 |
| 30 | 12 |
| 60 | 23 |
| 120 | 36 |

In some aspects, the CSI computation time Z or $Z_2$ and the UE PUSCH preparation time (without an A-CSI trigger) $N_2$ may be as described in 3GPP document TS 38.214 Release 16, titled "3rd Generation Partnership Project; Technical Specification Group Radio Access Network; NR; Physical layer procedures for data," April 2020, Sections 5.4 and Section 6.4, ("3GPP TS 38.214 document") which is incorporated herein by reference.

The substantially larger timeline for method 200A (when an A-CSI trigger is included along with the UL grant) in comparison with method 200B (when no A-CSI trigger is included) creates a number of scheduling problems. For example, a BS 105 may be interested in obtaining CSI for a large number of antenna ports and/or subband CQI and PMI, which would be high-latency CSI following the longer $Z_2$ timeline described above. And PUSCH resources for CSI transmission need to be pre-booked several slots in advance as illustrated in FIG. 2A (e.g., 6 slots in advance when using an SCS value of 30 kHz) and Table 1. As a result, UL data may not be transmitted in any of the pre-booked slots. Out-of-order PUSCH scheduling is not supported, so the UE cannot be scheduled with any PUSCH transmissions carrying only UL-SCH in the slots between when the UL grant and A-CSI trigger are transmitted, and when the CSI report is scheduled. Thus, if the UE 115 has URLLC data ready for transmission, the transmission of the URLLC data will be delayed, which may not be desirable as the latency requirements of the URLLC transmission may not be met. The scheduling problems may be due both to the time taken by a UE 115 to determine the requested CSI, and to jointly signaling the A-CSI trigger and the UL grant in a single PDCCH as in method 200A.

Figure 3:
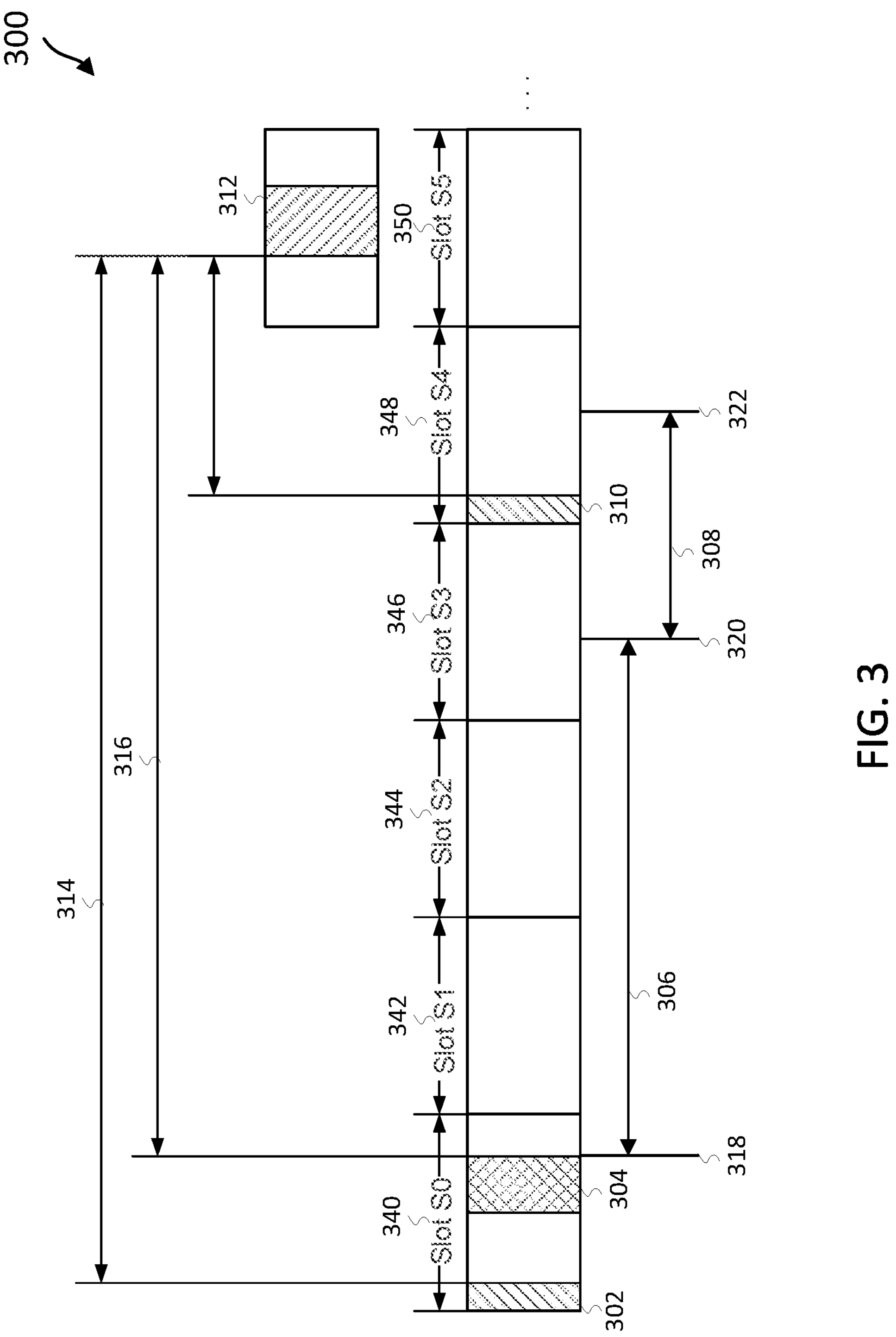
FIG. 3 illustrates a CSI request and resource allocation method according to some aspects of the present disclosure.

FIG. 3 illustrates a CSI request and resource allocation method 300 according to some aspects of the present disclosure. The method 300 addresses some of the problems caused by jointly signaling the A-CSI trigger and the UL grant in a single PDCCH as in method 200A. Instead of jointly signaling the A-CSI trigger and the UL grant in a single PDDCH, the method 300 divides the process into discrete steps: triggering the generation of the CSI report by sending the UE a CSI computation request 302 (e.g., as DCI in the PDCCH), and requesting the transmission of the CSI report by sending the UE a CSI report transmission request 310 (e.g., as DCI in the PDCCH). A BS 105 may include within the CSI computation request 302 information (e.g., in a CSI request field) indicating which downlink resources 304 (e.g., a CSI-RS or CSI-IM) the UE 115 may use to measure CSI. The CSI computation request 302, however, may not include any indication of which uplink resources to use for transmitting the CSI report. Although FIG. 3 illustrates the CSI measurement resource 304 to be located at a time after the CSI computation request 302, it should be understood that in other examples the CSI measurement resource 304 (e.g., RRC configured semi-persistent resource) can be located at a time before the CSI computation request 302. The UE 115 may determine CSI and store the results as described in FIGS. 4-8, but refrain from transmitting the CSI immediately. Instead, the UE 115 is free to make other uplink transmissions (as scheduled by the BS 105) including, for example, URLLC data or any other type of uplink data, until it receives the CSI report transmission request 310. In the example of method 300, the BS 105 may schedule the UE 115 to transmit uplink data in the remainder of slot S0 340, slot S1 342, slot S2 344, and slot S3 346. During slot S4 348, the UE 115 may receive the CSI report transmission request 310, including an allocation of resources 312 (e.g., on the PUSCH) for transmitting the CSI report, and in slot S5 350, the UE 115 may transmit the CSI report. The BS 105 may not transmit the CSI report transmission request 310 until the CSI computation timeline expires, here defined in terms of Z" 306, where Z" is the minimum gap between the CSI measurement resource 304 and the CSI report transmission request. The Z" 306 provides time for the UE 115 to perform CSI computation, rather than Z 314 or Z' 316 as discussed in FIGS. 2A and 2B. The UE 115 may also use a shortened timeline for reporting the CSI once it receives CSI report transmission request 310, corresponding to $N_2$ as described in FIG. 2B and using the sample values in Table 2 above.

The minimum gap Z" 306 can be a predetermined duration known to the BS 105 and the UE 115. For instance, the minimum gap Z" 306 can be defined by a wireless communication standard, such as the 3GPP. In some aspects, the minimum gap Z" 306 may be defined as a minimum gap from the end of the last symbol of the CSI measurement resource 304 to the beginning of the earliest symbol of the PDCCH (or CORESET) carrying the CSI report transmission request 310. In some other aspects, the minimum gap Z" 306 may be defined as a minimum gap from the end of the PDCCH (or CORESET) carrying the CSI computation request 302 to the beginning of the earliest symbol of the PDCCH (or CORESET) carrying the CSI report transmission request 310. As discussed above, in some instances, the CSI measurement resource 304 can be located at a time before the CSI computation request 302. When the CSI measurement resource 304 is located at a time before the CSI computation request 302, the minimum gap Z" 306 may be defined as a minimum gap from the end of the PDCCH (or CORESET) carrying the CSI computation request 302 to reduce implementation complexity at the UE 115.

The method 300 may employ a timer mechanism as described in FIGS. 4-9 to determine which, if any, CSI to transmit as part of the channel state report. For example, the UE 115 may start the timer at the end 320 of the Z" 306 timeline, and the timer may run for a duration 308 and expire at the end 322 of the duration 308. The timer duration may be pre-configured (e.g., to a value defined in a 3GPP specification). Alternately, the timer value could be configured by the BS 105 (e.g., through RRC signaling) or indicated by the BS 105 (e.g., as part of the CSI computation request 302). The timer duration may be based on the information (e.g., the CSI report content) the UE 115 is to include in the CSI report (e.g., the timer duration may be greater when the UE is to include more information in the CSI report). The timer duration may also be based on a codebook type, a number of antenna ports, a channel quality indicator (CQI) type, and/or a precoding matrix indicator (PMI) type associated with a CSI report. For example, a codebook type II-based CSI may be associated with a longer processing or computational time (and therefore associated with a longer timer duration) than a codebook type I-based CSI.

In some aspects, the minimum gap Z" 306 may be defined using similar mechanisms as described in the 3GPP TS 38.214 document Section 5.4. For instance, the UE 115 may start the timer at symbol $Z''_{ref}$, where $Z''_{ref}$ is defined as the next DL symbol with its cyclic prefix (CP) starting after a duration (e.g., $T''_{wait,CSI}$) has elapsed from the last symbol of the PDCCH (or CORESET) carrying the CSI computation request 302 triggering the CSI computation. The duration $$T''_{wait,CSI}$$

can be expressed as shown below:

$$T''_{wait,CSI} = Z'' \times (2048 + 144) \times \kappa 2^{-\mu} \times T_c, \quad (1)$$

where Z" represents Z" 306 in units of OFDM symbols, $\kappa$ is a constant, $\mu$ represents an SCS configuration, and $T_c$ represents a time unit in NR. In some instances, the $\mu$ parameter may be defined as a minimum value between an SCS configuration for PDCCH, denoted as $\mu_{PDCCH}$, and an SCS configuration for CSI-RS, denoted as $\mu_{CSI\text{-}RS}$, which may be expressed as $\min(\mu_{PDCCH}, \mu_{CSI\text{-}RS})$. The $\mu$ parameter may be independent from an SCS configuration for PUSCH as there is no PUSCH resource scheduled in the DCI carrying the CSI computation request 302.

If the CSI report transmission request 310 arrives while the timer is running (as illustrated here), the UE 115 may transmit the most recently computed CSI (based on the CSI measurement resource 304) in the CSI report. However, if the UE 115 receives the CSI report transmission request 310 before the timer has started, it may be that the UE 115 has not been able to complete the requested channel estimation and/or interference measurement or the UE 115 may have missed an earlier CSI-computation request. If the CSI report transmission request is received after the timer has expired, it may indicate that the most-recently computed CSI data is now stale, or the UE 115 may have missed an earlier CSI report request. In either case—when the CSI transmission request 310 is received before the timer starts or after the timer is expired— the UE 115 may transmit CSI which may not be current (e.g., the most recently stored—now stale—CSI, or a previously stored CSI and based on an older CSI computation request and corresponding CSI measurement resource) CSI or placeholder data in the CSI report. The transmission of the stale CSI is to satisfy the CSI report transmission request since the UE is to transmit as scheduled by the BS. Transmitting a non-current CSI or placeholder data may be appropriate when, for example, the transmission on which the CSI report transmission request arrived also included a grant for transmitting uplink shared channel (UL-SCH) data or hybrid automatic repeat request (HARQ) acknowledgements. The placeholder CSI may function as a filler since the BS is expecting a PUSCH transmission including the CSI and the UL-SCH data or the CSI and the HARQ ACK. It may not be desirable for the UE to drop the UL-SCH data or the HARQ ACK because of a CSI report transmission request failing to conform to the CSI report timeline. In that case, the BS 105 may determine that the CSI report is not based on the most recent CSI computation request. Alternately, the UE may ignore the CSI report transmission request altogether (i.e., refrain from transmitting a CSI report), for example, if the CSI transmission request only included a grant for transmitting the CSI report. In some aspects, the UE 115 may remove a stored CSI from memory based on the timer expiring.

Figure 4:
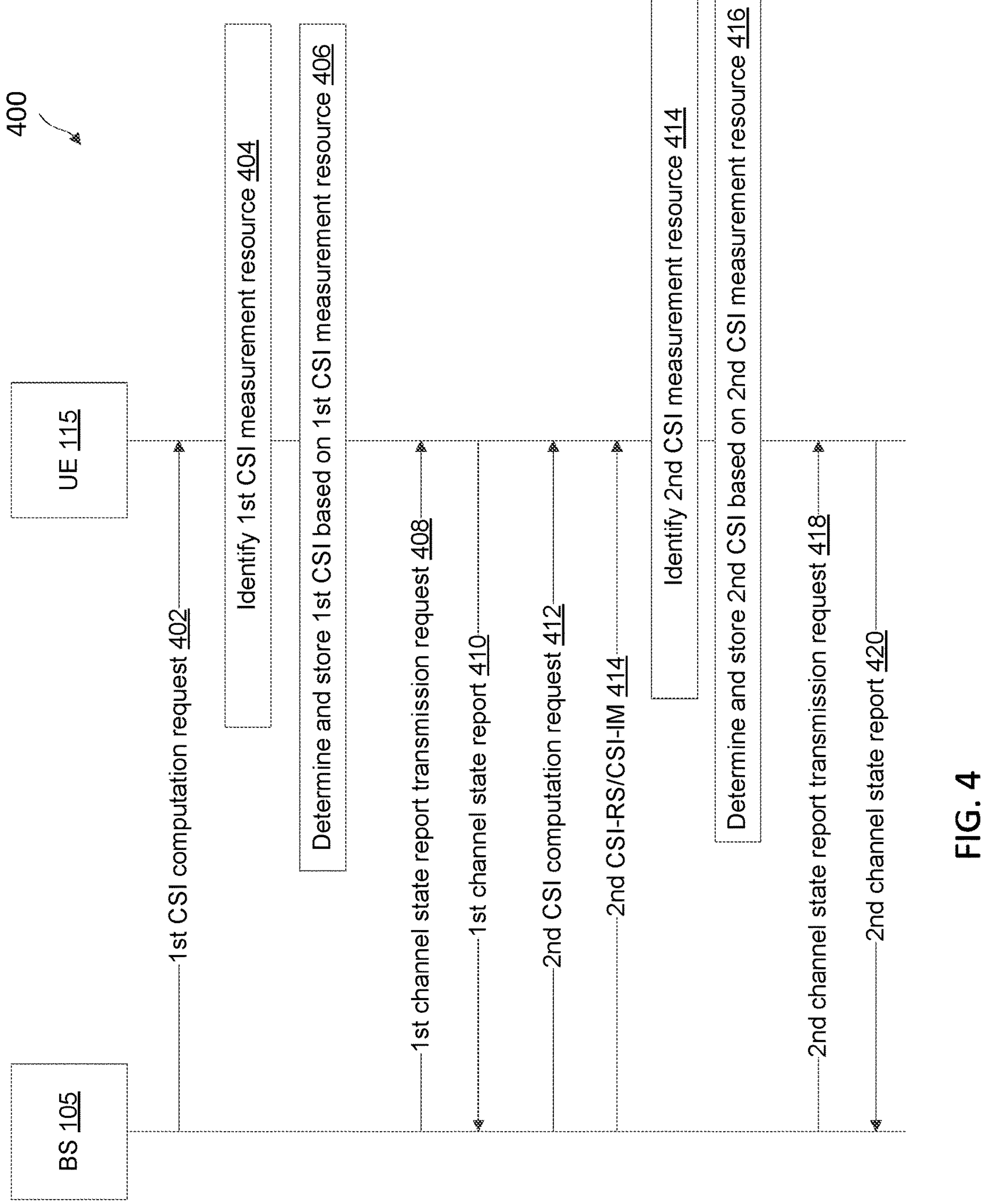
FIG. 4 is an exemplary sequence diagram illustrating a communication sequence according to some aspects of the present disclosure.

FIG. 4 is an exemplary sequence diagram illustrating a communication method 400 between a BS 105 and a UE 115 according to some aspects of the present disclosure. The method 400 may employ similar mechanism as the method 300 discussed above with respect to FIG. 3. As illustrated, the method 400 includes a number of enumerated actions, but embodiments of the method 400 may include additional actions before, after, and in between the enumerated actions. In some embodiments, one or more of the enumerated actions may be omitted or performed in a different order.

At step 402, the BS 105 may transmit to the UE 115 a first CSI computation request (also referred to as a computation trigger), which may include an indication of a CSI measurement resource on which the UE 115 should perform CSI measurement. The BS 105 may transmit the first CSI computation request as a downlink control information (DCI) message in the PDCCH (also referred to herein as a compute-only DCI), and the first CSI computation request may not include any grant of UL resources for transmission of the CSI report. In other words, the first CSI computation request may not include any scheduling information for transmitting the CSI report.

At step 404, the UE 115 may identify a first CSI measurement resource based on the CSI computation request. The first CSI measurement resource may correspond to a CSI-RS (e.g., an NZP CSI-RS) resource that the UE 115 may use for channel response measurement and/or a CSI-IM resource that the UE 115 may use for interference measurement. The first CSI measurement resource may be located at a time after the first CSI computation request. Alternately, the first CSI measurement resource may be located at a time before the CSI computation request (e.g., if the CSI is to be based on a periodic or semi-persistent CSI-RS configured via RRC).

At step 406, the UE 115 may determine a first CSI based on the first CSI measurement resource. The UE may perform channel and/or interference measurement to determine the CSI. The UE 115 may store the resulting CSI in memory within the UE 115. While the UE 115 is computing the first CSI and/or after the UE 115 computes the first CSI, the UE 115 may receive a scheduling grant (e.g., for URLLC data) from the BS 105 and may transmit uplink data based on the scheduling grant. In some instances, the UE 115 may keep multiple CSIs stored in its memory (e.g., the memory 704 of FIG. 7) corresponding to different CSI computation requests and CSI measurement resources. The UE 115 may store and maintain multiple CSIs in its memory. In some instances, there may be a limit to the number of CSIs the UE may store, and the UE may delete a stored CSI (e.g., the oldest stored CSI) or not store a newly computed CSI if the number of CSIs in memory exceeds the limit.

At step 408, the UE 115 may receive from the BS 105 (e.g., as a DCI message on the PDDCH) a channel state report transmission request associated with the first CSI measurement resource. The channel state report transmission request may indicate that the UE 115 may transmit a report including the first CSI it computed based on the first CSI measurement resource. The CSI report transmission request may indicate which uplink resources (e.g., PUSCH resources) the UE 115 may use for transmitting the report. In an example, the channel state report transmission request (e.g., report-only DCI) includes a CSI request field including a value that maps to a CSI triggering state. The CSI triggering state may be associated with a CSI report configuration referencing the first CSI measurement resource to be used for reporting CSI. Accordingly, the UE 115 may determine that the BS 105 is requesting CSI for the first CSI measurement resource.

At step 410, the UE 115 may transmit a channel state report including first CSI to the BS 105. In some instances, the UE 115 may employ a timer as described below in detail with respect to method 500 (illustrated in FIG. 5) to determine which, if any, stored CSI to transmit to the BS 105 in response to the CSI transmission request, as described in step 418 below.

At step 412, the BS 105 may transmit a second CSI computation request in a similar manner as the first computation request.

At step 414, the UE 115 may identify a second CSI measurement resource in a similar manner as the first CSI measurement resource. The UE 115 may perform channel and/or interference measurement to determine the CSI. While and/or after the UE 115 is computing the CSI based on the second CSI measurement resource, the UE 115 may receive a scheduling grant (e.g., for URLLC data) from the BS 105 and may transmit uplink data based on the scheduling grant. The UE 115 may store the CSI determined based on the second CSI measurement resource in memory (e.g., the memory 704 of FIG. 7). As described in step 406, the number of CSIs the UE 115 can store may be limited. For example, if the limit has been reached, the UE 115 may delete an older CSI (for example the CSI from step 406) or refrain from the storing the newly computed CSI.

At step 416, the UE 115 may determine and store a second CSI based on the second CSI measurement resource.

At step 418, the UE 115 may receive from the BS 105 (e.g., as a DCI message on the PDCCH) a second channel state report transmission request associated with the second CSI measurement resource. The second channel state report transmission request may indicate that the UE 115 may now transmit a CSI report including the second CSI it computed in response to the second CSI computation request based on the second CSI measurement resource. The second CSI report transmission request may indicate which uplink resources (e.g., PUSCH resources) the UE 115 may use for transmitting the report.

In some instances, the UE 115 may employ a timer mechanism to determine whether to transmit the second CSI as requested by the BS 105, the first CSI, or a different or no CSI. For example, the UE 115 may start (or reset) a timer after some period (or duration) has elapsed from the end time of the second CSI measurement resource. The period may be (approximately) the minimum gap between the end time of the second CSI measurement resource and when the UE 115 may have the second CSI determined. The timer duration may be pre-configured (e.g., to a value defined in a 3GPP specification). Alternately, the timer value could be indicated by the BS 105 (e.g., through RRC signaling) or configured by the BS 105 (e.g., as part of the CSI computation request). The timer duration may be based on the information the UE 115 is to include in the second CSI report (e.g., the timer duration may be greater when the UE is to include more information in the second CSI report). The timer duration may also be based on a codebook type, a number of antenna ports, a channel quality indicator (CQI) type, and/or a precoding matrix indicator (PMI) type associated with the second CSI report.

In some instances, the period of time for which the timer is running may correspond to the period of time for which the second CSI report should be transmitted to the BS 105 in response to receiving the second CSI report transmission request. For example, if the second CSI report transmission request arrives while the timer is running, the UE 115 may transmit the second CSI (i.e., the most recently computed CSI) in the CSI report. However, if the UE 115 receives the second CSI report transmission request before the timer has started, it may be that the UE 115 has not been able to complete the requested channel estimation and/or interference measurement corresponding to the second CSI measurement resource. If the second CSI report transmission request is received after the timer has expired, it may indicate that the second CSI is now stale. In either case—when the second CSI transmission request is received before the timer starts or after the timer is expired— the UE 115 may transmit CSI which may not be current (e.g., the most recently stored—now stale—CSI, or a previously stored CSI and based on an older CSI computation request and corresponding CSI measurement resource). For example, the UE 115 may determine to transmit the first CSI it determined and stored at step 406. The UE 115 may also determine to transmit placeholder data in the CSI report rather than the second CSI. Transmitting the first CSI or placeholder data may be appropriate when, for example, the transmission on which the second CSI transmission request arrived also included a grant for transmitting UL-SCH data or HARQ acknowledgements. Alternately, the UE 115 may ignore the second CSI report transmission request altogether (i.e., refrain from transmitting a CSI report), for example, if the second CSI transmission request only included a grant for transmitting the CSI report. In some instances, the UE 115 may also remove a stored CSI from memory based on the timer expiring.

At block 420, the UE 115 optionally transmits the second channel state report (e.g., in the uplink resources indicated in the second CSI report transmission request) including the CSI (or placeholder data) it determined to include after step 418.

Figure 5:
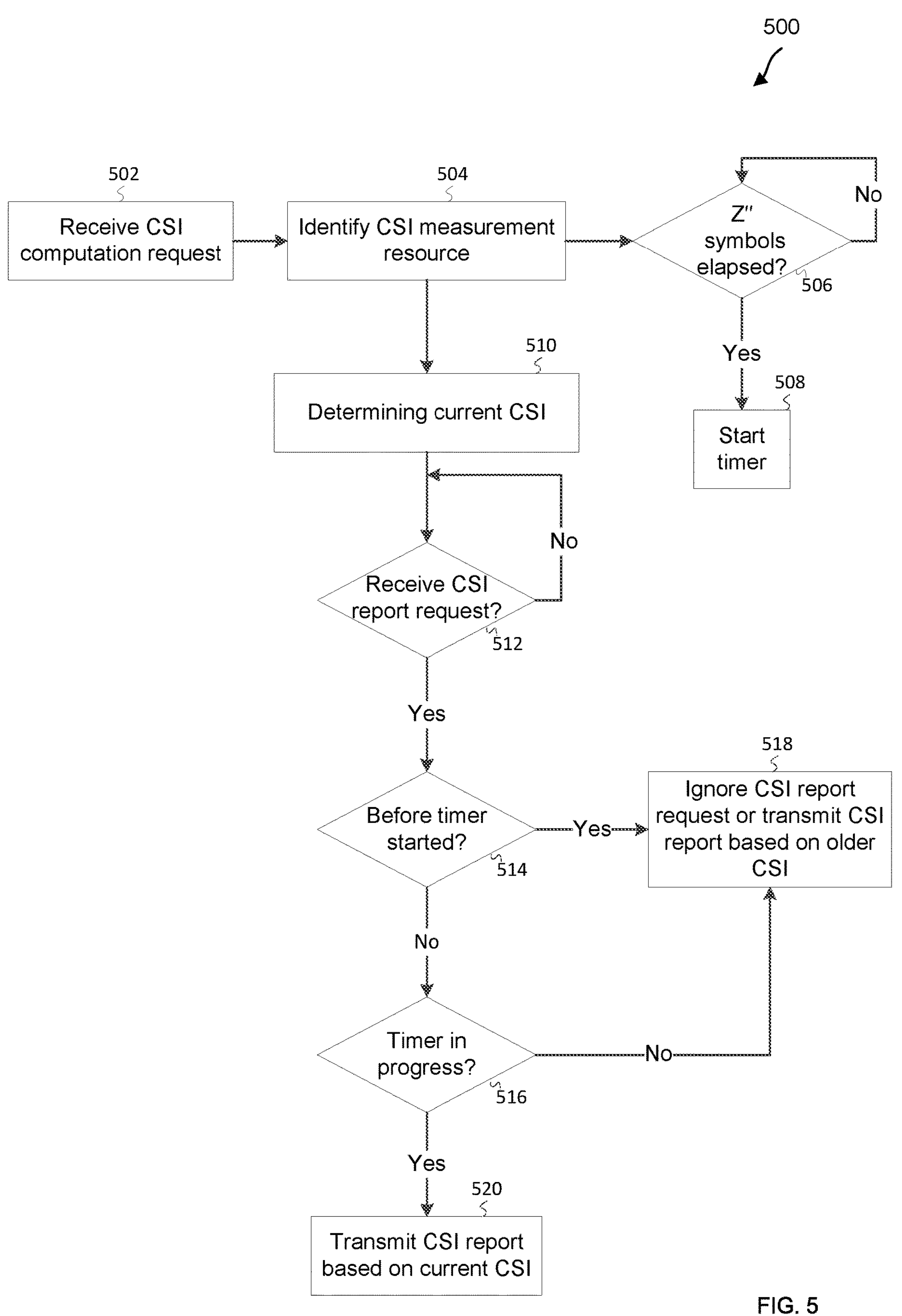
FIG. 5 is a flow diagram of wireless communication according to some aspects of the present disclosure.

FIG. 5 is a flow diagram of a wireless communication method 500 according to some aspects of the present disclosure. Aspects of the method may be performed by a UE 115 alone or in combination with a BS 105.

At block 502, the UE 115 may receive a CSI computation request (e.g., in a DCI message on the PDCCH) from a BS 105, as described in detail in FIGS. 6-9. The CSI computation request may not indicate any resources for UL transmission of CSI data.

At block 504, the UE 115 may identify a CSI measurement resource based on the CSI computation request. The CSI measurement resource may correspond to a CSI-RS (e.g., an NZP CSI-RS) resource that the UE 115 may use for channel response measurement and/or a CSI-IM resource that the UE 115 may use for interference measurement. The first CSI measurement resource may be located at a time after the first CSI computation request. Alternately, the first CSI measurement resource may be located at a time before the CSI computation request (e.g., if the CSI is to be based on a periodic or semi-persistent CSI-RS configured via RRC). The method then proceeds to blocks 506 and 510. For instance, the UE 115 may perform blocks 506 and 510 in parallel.

At block 506, the UE 115 starts a timer after Z" symbols, where Z" is the minimum gap between the end of the CSI measurement resource (e.g., CSI-RS resource and/or CSI-IM resource) and the beginning of the CSI report transmission request (e.g., the soonest the UE 115 could finish determining the CSI). Once Z" symbols have elapsed, the UE 115 starts (or resets) a timer during which it expects to receive a CSI report transmission request. The timer may help the UE 115 determine which, if any, stored CSI to transmit to the BS in response to the CSI transmission request as described herein. The timer duration may be pre-configured (e.g., to a value defined in a 3GPP specification). Alternately, the timer value could be indicated by the BS 105 (e.g., through RRC signaling) or configured by the BS 105 (e.g., as part of the CSI computation request). The timer duration may be based on the information the UE 115 is to include in the CSI report (e.g., the timer duration may be greater when the UE is to include more information in the CSI report). The timer duration may also be based on a codebook type, a number of antenna ports, a channel quality indicator (CQI) type, and/or a precoding matrix indicator (PMI) type associated with a CSI report.

At block 510, the UE 115 determines CSI based on the CSI measurement resource. The UE 115 may perform channel measurements and/or interference measurement on the CSI measurement resource. For example, if the CSI measurement resource includes a CSI-RS measurement resource, the UE 115 may perform channel measurement based on a CSI-RS transmitted in the CSI-RS measurement resource. Additionally or alternatively, if the CSI measurement resource includes a CSI-IM resource, the UE 116 may measure interference in the CSI-IM resource. While performing the channel measurement (or after), the UE 115 may transmit UL data (e.g., URLLC data unrelated to CSI data) to the BS 105. For example, the BS 105 may transmit an UL grant to the UE 115 during this time (e.g., during the gap 306 of FIG. 3), and the UE 115 may transmit uplink data to the BS 105 (e.g., on the PUSCH). Although FIG. 5 illustrates the UE 115 determining the CSI after receiving the CSI computation request, it should be understood that in other examples, the CSI computation request may reference a CSI measurement resource (e.g., an RRC configured semi-persistent CSI resource) located a time before the CSI computation request. Accordingly, the UE 115 may have already started or completed the CSI computation when the UE 115 received the CSI computation request.

At block 512, the UE 115 may receive a CSI report transmission request. If the UE 115 has not received the request, the UE 115 may remain at this block until it does. Once the UE 115 receives a CSI report transmission, the UE 115 may proceed to block 514.

At block 514, the UE 115 determines whether the CSI report transmission request was received before the timer (of block 508) started, which may indicate that the UE 115 has not had time to finish determining the CSI. If the CSI report transmission request was received before the timer started, the UE 115 proceeds to block 518. Otherwise, the UE 115 proceeds to block 516.

At block 516, the UE 115 determines whether the timer (of block 508) is currently in progress. If the timer is in progress, the UE 115 proceeds to block 520. If the timer is not in progress (i.e., it is expired), the CSI determined by the UE at block 510 may be stale, and the UE 115 proceeds to block 518.

At block 518, the UE 115 may transmit an older CSI (e.g., previously stored and based on an earlier CSI computation request and corresponding earlier CSI measurement resource) or placeholder data in the CSI report, based on the CSI report transmission request coming too early (as determined at block 514) or too late (as determined at block 516). Transmitting an older CSI or placeholder data may be appropriate when, for example, the transmission on which the CSI transmission request arrived also included a grant for transmitting uplink shared channel (UL-SCH) data or hybrid automatic repeat request (HARQ) acknowledgements. Alternately, the UE 115 may ignore the CSI report transmission request altogether (i.e., refrain from transmitting a CSI report), for example, if the CSI transmission request only included a grant for transmitting the CSI report.

At block 520, the UE 115 may transmit a CSI report based on the current CSI.

Figure 6:
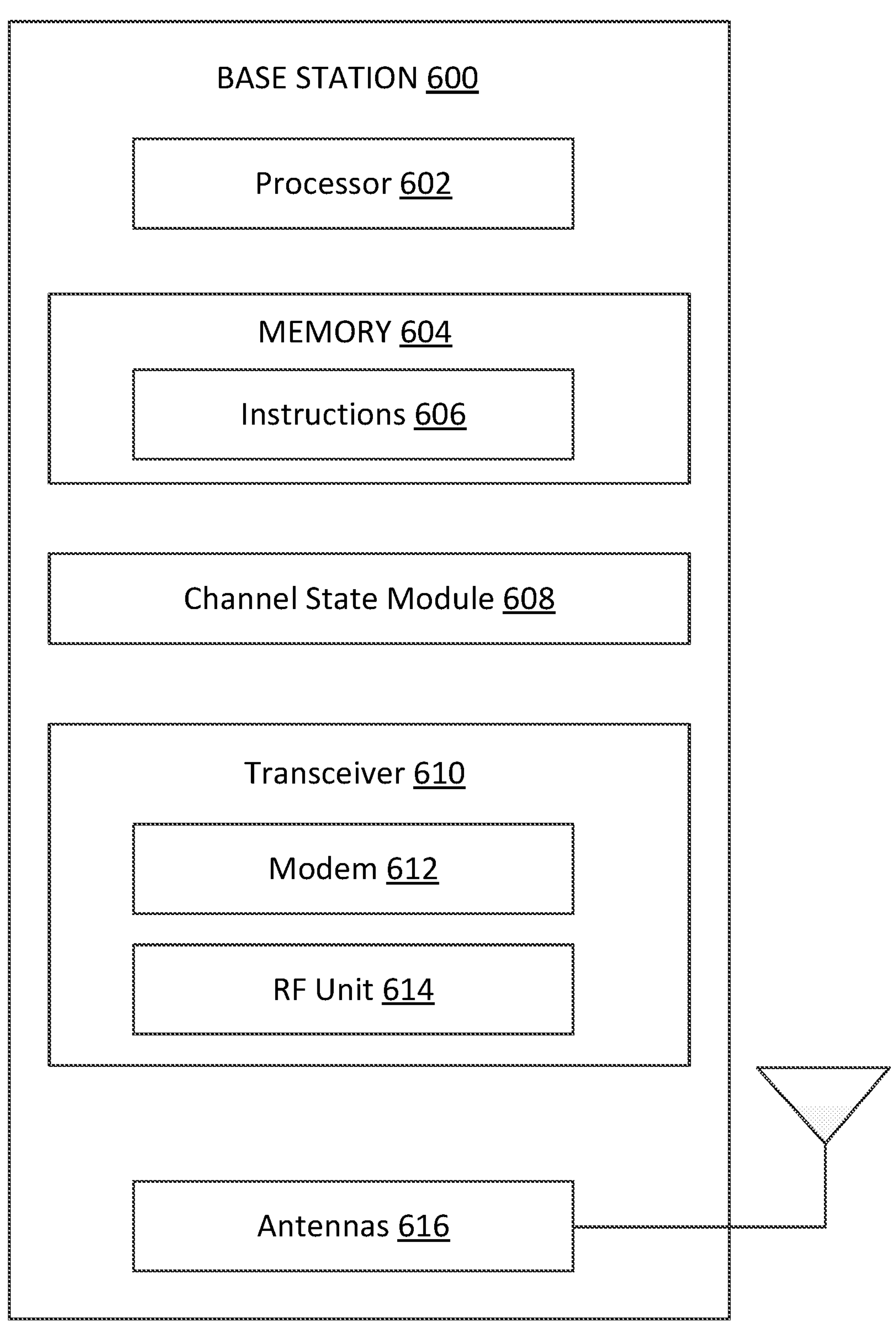
FIG. 6 is a block diagram of an exemplary base station (BS) according to some aspects of the present disclosure.

FIG. 6 is a block diagram of an exemplary BS 600 according to some aspects of the present disclosure. The BS 600 may be a BS 105 in the network 100 as discussed above in FIG. 1. As shown, the BS 600 may include a processor 602, a memory 604, a channel state module 608, a transceiver 610 including a modem subsystem 612 and a RF unit 614, and one or more antennas 616. These elements may be in direct or indirect communication with each other, for example via one or more buses.

The processor 602 may have various features as a specific-type processor. For example, these may include a CPU, a DSP, an ASIC, a controller, a FPGA device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 604 may include a non-transitory computer-readable medium. The memory 604 may store instructions 606. The instructions 606 may include instructions that, when executed by the processor 602, cause the processor 602 to perform operations described herein, for example, aspects of FIGS. 6-9 and 11. Instructions 606 may also be referred to as program code. The program code may be for causing a wireless communication device to perform these operations, for example by causing one or more processors (such as processor 602) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The channel state module 608 may be implemented via hardware, software, or combinations thereof. For example, the channel state module 608 may be implemented as a processor, circuit, and/or instructions 606 stored in the memory 604 and executed by the processor 602. In some examples, the channel state module 608 can be integrated within the modem subsystem 612. For example, the channel state module 608 can be implemented by a combination of software components (e.g., executed by a DSP or a general processor) and hardware components (e.g., logic gates and circuitry) within the modem subsystem 612.

The channel state module 608 may be used for various aspects of the present disclosure, for example, aspects of FIGS. 3-5 and 9. For example, the channel state module 608 may transmit a CSI computation request (e.g., in coordination with the transceiver 610). The channel state module 608 may transmit the CSI computation request as a downlink control information (DCI) message in the PDCCH (also referred to herein as a compute-only DCI), and the CSI computation request may not include any grant of UL resources for transmission of the CSI report by the UE 115. In other words, the CSI computation request may not indicate any scheduling information or resources for transmitting the CSI report.

The channel state module 608 may also be configured to transmit (e.g., in coordination with the transceiver 610), to the UE 115 (e.g., as a DCI message on the PDDCH), a channel state report transmission request associated with a first CSI measurement resource. The first CSI measurement resource may include a CSI-RS (e.g., an NZP CSI-RS) resource and/or a CSI-IM resource. The channel state report transmission request may indicate that the UE 115 should transmit a report including CSI it computed based on the first CSI measurement resource. The CSI report transmission request may indicate which uplink resources (e.g., PUSCH resources) the UE 115 should use when transmitting the report. In some instances, the channel state module 608 may transmit the channel state report transmission request after a first duration has elapsed from the time the where the first CSI measurement resource is located (e.g., the beginning or the end of the first CSI measurement resource). The first duration may be based on a CSI computation timeline (e.g., as may be defined in a 3GPP specification), as described with respect to FIG. 3. In some instances, the channel state module 608 may also indicate to the UE 115 a configuration for a duration of a timer for associating the CSI report to the first CSI measurement resource (e.g., via RRC signaling, or as part of the CSI computation request). The timer duration may be based on the information (CSI report types) to be included in the CSI report (e.g., the timer duration may be greater when more information is to be in the CSI report). The timer duration may also be based on a codebook type, a number of antenna ports, a channel quality indicator (CQI) type, and/or a precoding matrix indicator (PMI) type associated with a CSI report.

The channel state module 608 may also be configured to receive (e.g., in coordination with the transceiver 610, on the PUSCH, using resources indicated by the channel state module 608 in the channel state report transmission request), in response to the channel state report transmission request, a channel state report associated with the first CSI measurement resource. In some aspects, the channel state report may instead be associated with a different CSI measurement resource. For example, the channel state module 608 may transmit to the UE 115 an indication of a second CSI measurement resource before the first CSI measurement resource. Depending on when the channel state module 608 transmits the CSI report transmission request, the channel state report may instead be based on the second CSI measurement resource. For example, if the channel state module 608 transmits the CSI report transmission request while a timer is running (e.g., the timer described in FIG. 5, which may be configured by the channel state module 608), the channel state report may be based on the first CSI measurement resource. However, if the CSI report transmission request is transmitted before the timer is started (possibly too early for the UE 115 to finish determining the CSI) or after the timer expires (possibly when the CSI is stale), the channel state module 608 may instead receive a CSI report based on the second CSI measurement resource, or placeholder data. This may be the case when, for example, the BS 105 included a grant for transmitting UL-SCH data or HARQ acknowledgements along with the grant for transmitting the CSI report. In some instances, the channel state module 608 may not receive a CSI report at all, for example, if the channel state module 608 scheduled uplink resources only for the CSI report.

In some aspects, the BS 105 may transmit to the UE 115 (e.g., in coordination with the transceiver 610) a scheduling grant after the channel state module 608 transmits the CSI computation request and before the channel state module 608 transmits the CSI report transmission request. The BS 115 may then receive an uplink transmission (e.g., a transmission associated with URLLC data) from the UE 115 on based on the scheduling grant.

As shown, the transceiver 610 may include the modem subsystem 612 and the RF unit 614. The transceiver 610 can be configured to communicate bi-directionally with other devices, such as the UEs 115 and/or 500 and/or another core network element. The modem subsystem 612 may be configured to modulate and/or encode data according to a MCS, e.g., a LDPC coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data (e.g., PDCCHs signal, DL data, scheduling grants, RRC configurations, reference signals, CSI-RSs, CSI computation requests, CSI report transmission requests, CSI-compute-only DCI, CSI-report-only CSI, etc.) from the modem subsystem 612 (on outbound transmissions) or of transmissions originating from another source such as a UE 115 and/or UE 700. The RF unit 614 may be further configured to perform analog beamforming in conjunction with the digital beamforming. Although shown as integrated together in transceiver 610, the modem subsystem 612 and/or the RF unit 614 may be separate devices that are coupled together at the BS 105 to enable the BS 105 to communicate with other devices.

The RF unit 614 may provide modulated and/or processed data, e.g. data packets (or, more generally, data messages that may contain one or more data packets and other information), to the antennas 616 for transmission to one or more other devices. The antennas 616 may further receive data messages transmitted from other devices and provide the received data messages for processing and/or demodulation at the transceiver 610. The transceiver 610 may provide the demodulated and decoded data (e.g., PUSCH signal, UL data, UL URLLC, CSI reports) to the channel state module 608 for processing. The antennas 616 may include multiple antennas of similar or different designs to sustain multiple transmission links.

In an example, the transceiver 610 is configured to transmit, to a UE 115, a CSI computation request. The transceiver 610 is further configured to transmit, to the UE 115, a CSI report transmission request associated with a first CSI measurement resource, and receive, from the UE 115 in response to the CSI report transmission request, a CSI report associated with the first CSI measurement resource.

Figure 7:
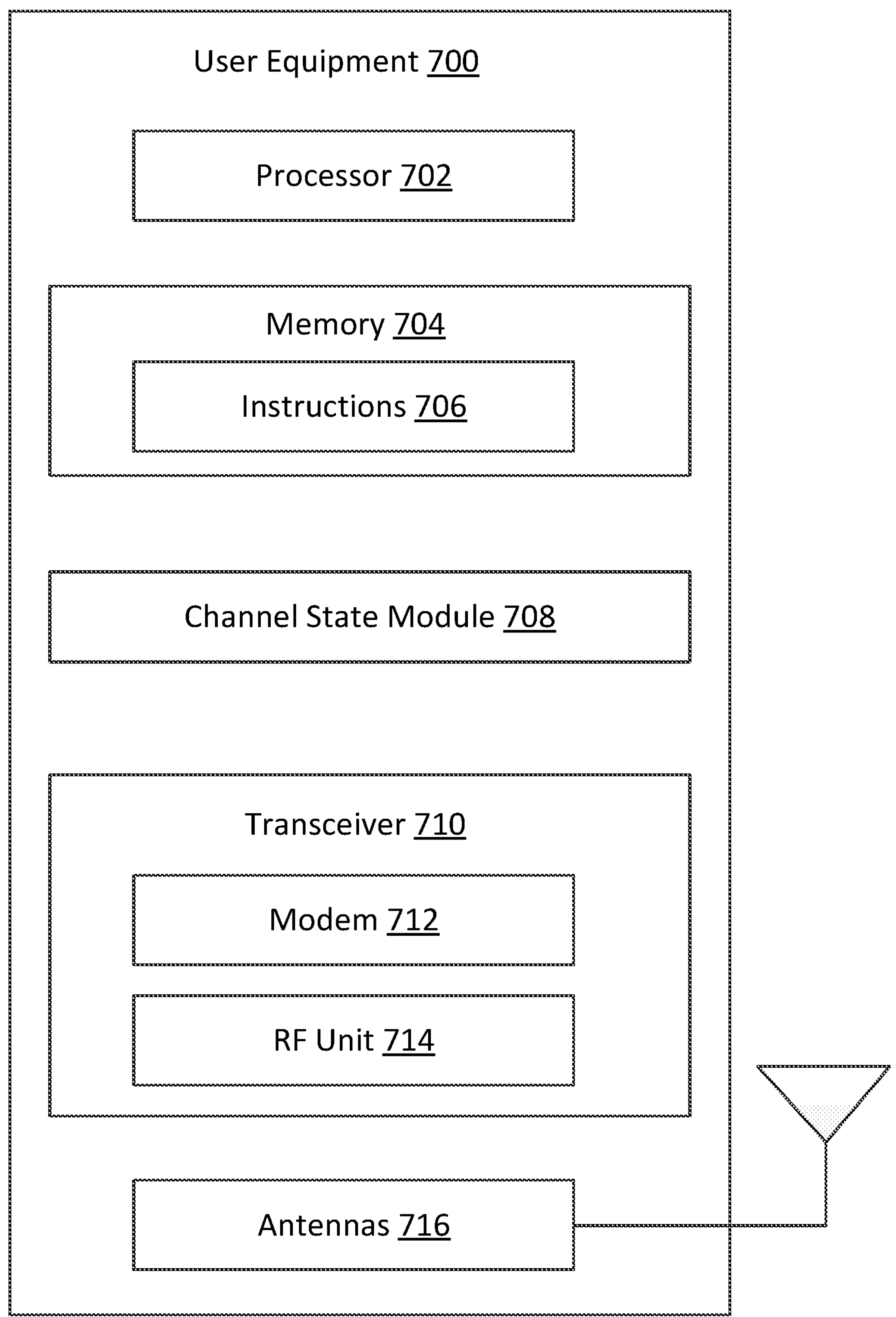
FIG. 7 is a block diagram of an exemplary user equipment (UE) according to some aspects of the present disclosure.

FIG. 7 is a block diagram of an exemplary UE 700 according to some aspects of the present disclosure. The UE 700 may be a UE 115 discussed above in FIG. 1. As shown, the UE 700 may include a processor 702, a memory 704, a channel state module 708, a transceiver 710 including a modem subsystem 712 and a radio frequency (RF) unit 714, and one or more antennas 716. These elements may be in direct or indirect communication with each other, for example via one or more buses.

The processor 702 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 704 includes a non-transitory computer-readable medium. The memory 704 may store, or have recorded thereon, instructions 706. The instructions 706 may include instructions that, when executed by the processor 702, cause the processor 702 to perform the operations described herein with reference to the UEs 115 in connection with aspects of the present disclosure, for example, aspects of FIGS. 6-8, 10, and 12. Instructions 706 may also be referred to as program code, which may be interpreted broadly to include any type of computer-readable statement(s) as discussed above with respect to FIG. 4.

The channel state module 708 may be implemented via hardware, software, or combinations thereof. For example, the channel state module 708 may be implemented as a processor, circuit, and/or instructions 706 stored in the memory 704 and executed by the processor 702. In some examples, the channel state module 708 can be integrated within the modem subsystem 712. For example, the channel state module 708 can be implemented by a combination of software components (e.g., executed by a DSP or a general processor) and hardware components (e.g., logic gates and circuitry) within the modem subsystem 712. Operations described as being performed by the channel state module 708 may be performed by, or in conjunction with, a different module, e.g., the transceiver 710.

The channel state module 708 may be used for various aspects of the present disclosure, for example, aspects of FIGS. 3-5 and 8. For example, the channel state module 708 may be configured to receive (e.g., in coordination with the transceiver 710), from a BS 105, a CSI computation request. The channel state module 708 may receive the CSI computation request as a downlink control information (DCI) message in the PDCCH (also referred to herein as a compute-only DCI), and the CSI computation request may not include any grant of UL resources for transmission of the CSI report. In other words, the CSI computation request may not include any scheduling information for transmitting the CSI report.

The channel state module 708 may also be configured to identify, based on the CSI computation request, a first CSI measurement resource. The CSI measurement resource may include a CSI-RS and/or CSI-IM resource. The channel state module 708 may receive from the BS 105 a configuration for the first CSI measurement resource (e.g., included in the CSI computation request, or separately).

The channel state module 708 may also be configured to determine CSI based on the first CSI measurement resource (e.g., in coordination with the processor 702). The channel state module 708 may perform channel and/or interference measurement to determine the CSI. In some instances, the channel state module 708 may store the resulting CSI in memory 704. Afterwards, the UE 115 may continue to transmit other types of uplink data (e.g., URLLC data). For example, the UE 115 may receive a scheduling grant from the BS 105 and may transmit uplink data based on the scheduling grant. In some instances, the channel state module 708 may keep multiple CSIs stored in its memory corresponding to different CSI computation requests and CSI measurement resources. For example, the channel state module 708 may have received an indication of a second CSI measurement resource before the first CSI measurement resource. The channel state module 708 may perform channel and/or interference measurement based on the second reference CSI measurement resource and stored the resulting CSI in memory 704. The channel state module 708 may store and maintain multiple CSIs in its memory 704. In some instances, there may be a limit to the number of CSIs the channel state module 708 may store, and the channel state module 708 may delete a stored CSI or not store a newly computed CSI if the number of CSIs in memory 704 exceeds the limit.

The channel state module 708 may also be configured to receive, from the BS 105 (e.g., in coordination with the transceiver 710, as a DCI message on the PDDCH), a channel state report transmission request associated with the first CSI measurement resource. The channel state report transmission request may indicate that the channel state module 708 should now transmit a report including the CSI it computed based on the first CSI measurement resource. The CSI report transmission request may indicate which uplink resources (e.g., PUSCH resources) the channel state module 708 should use when transmitting the report. The channel state module 708 may then transmit a channel state report including CSI to the BS 105 (e.g., in coordination with the transceiver 710).

In some instances, the channel state module 708 may employ a timer as described in method 500 (illustrated in FIG. 5) to determine which, if any, stored CSI to transmit to the BS 105 in response to the CSI transmission request. For example, the channel state module 708 may start (or reset) a timer after some period (or duration) has elapsed from the time where the first CSI measurement resource is located (e.g., the beginning or the end of the first CSI measurement resource). The period may be (approximately) the minimum gap between the end time of the CSI measurement resource and when the channel state module 708 could have the CSI determined. The timer duration may be pre-configured (e.g., to a value defined in a 3GPP specification). Alternately, the timer value could be indicated by the BS 105 (e.g., through RRC signaling) or configured by the BS 105 (e.g., as part of the CSI computation request). The timer duration may be based on the information the channel state module 708 is to include in the CSI report (e.g., the timer duration may be greater when the channel state module 708 is to include more information in the CSI report). The timer duration may also be based on a codebook type, a number of antenna ports, a channel quality indicator (CQI) type, and/or a precoding matrix indicator (PMI) type associated with a CSI report.

The period of time for which the timer is running may correspond to the period of time for which the current CSI report should be transmitted to the BS 105 in response to receiving the CSI report transmission request. For example, if the CSI report transmission request arrives while the timer is running, the channel state module 708 may transmit the most recently computed CSI (i.e., based on the first CSI measurement resource) in the CSI report. However, if the channel state module 708 receives the CSI report transmission request before the timer has started, it may be that the channel state module 708 has not been able to complete the requested channel estimation and/or interference measurement. If the CSI report transmission request is received after the timer has expired, it may indicate that the most-recently computed CSI data is now stale. In either case— when the CSI transmission request is received before the timer starts or after the timer is expired— the channel state module 708 may transmit CSI that is not current (e.g., previously stored) CSI. For example, the channel state module 708 may transmit the CSI determined with respect to the second (earlier) CSI measurement resource rather than the most recent (later) first CSI measurement resource. The channel state module 708 may also transmit placeholder data in the CSI report rather than actual CSI. Transmitting an older CSI or placeholder data may be appropriate when, for example, the transmission on which the CSI transmission request arrived also included a grant for transmitting UL-SCH data or HARQ acknowledgements. Alternately, the channel state module 708 may ignore the CSI report transmission request altogether (i.e., refrain from transmitting a CSI report), for example, if the CSI transmission request only included a grant for transmitting the CSI report. In some instances, the channel state module 708 may also remove a stored CSI from memory based on the timer expiring.

As shown, the transceiver 710 may include a modem subsystem 712 and an RF unit 714. The transceiver 710 can be configured to communicate bi-directionally with other devices, such as the BSs 105. The modem subsystem 712 may be configured to modulate and/or encode the data from the memory 704 and/or the channel state module 708 according to a modulation and coding scheme (MCS), e.g., a low-density parity check (LDPC) coding scheme, a turbo coding scheme, a convolutional coding scheme, a digital beamforming scheme, etc. The RF unit 714 may be configured to process (e.g., perform analog to digital conversion or digital to analog conversion, etc.) modulated/encoded data (e.g., PUSCH signals, UL data, UL URLLC data, CSI reports) from the modem subsystem 712 (on outbound transmissions) or of transmissions originating from another source such as a UE 115 or a BS 105. The RF unit 714 may be further configured to perform analog beamforming in conjunction with the digital beamforming. Although shown as integrated together in transceiver 710, the modem subsystem 712 and the RF unit 714 may be separate devices that are coupled together at the UE 115 to enable the UE 115 to communicate with other devices.

The RF unit 714 may provide modulated and/or processed data, e.g. data packets (or, more generally, data messages that may contain one or more data packets and other information), to the antennas 716 for transmission to one or more other devices. The antennas 716 may further receive data messages transmitted from other devices. The antennas 716 may provide the received data messages for processing and/or demodulation at the transceiver 710. The transceiver 710 may provide the demodulated and decoded data (e.g., PDCCH signals, DL data, scheduling grants, CSI-RS s, CSI report requests, CSI report transmission requests, CSI-compute-only DCI, CSI-report-only CSI, etc.) to the channel state module 708 for processing. The antennas 716 may include multiple antennas of similar or different designs in order to sustain multiple transmission links. The RF unit 714 may configure the antennas 716.

In an aspect, the UE 700 can include multiple transceivers 710 implementing different RATs (e.g., NR and LTE). In an aspect, the UE 700 can include a single transceiver 710 implementing multiple RATs (e.g., NR and LTE). In an aspect, the transceiver 710 can include various components, where different combinations of components can implement different RATs.

In an example, the transceiver 710 is configured to receive, from a BS 105, a CSI computation request. The processor 702 is configured to identify, based on the CSI computation request, a first CSI measurement resource, and determine CSI based on the first CSI measurement resource. The transceiver 710 is further configured to receive, from the BS 105 after the CSI computation request, a CSI report transmission request associated with the first CSI measurement resource.

Figure 8:
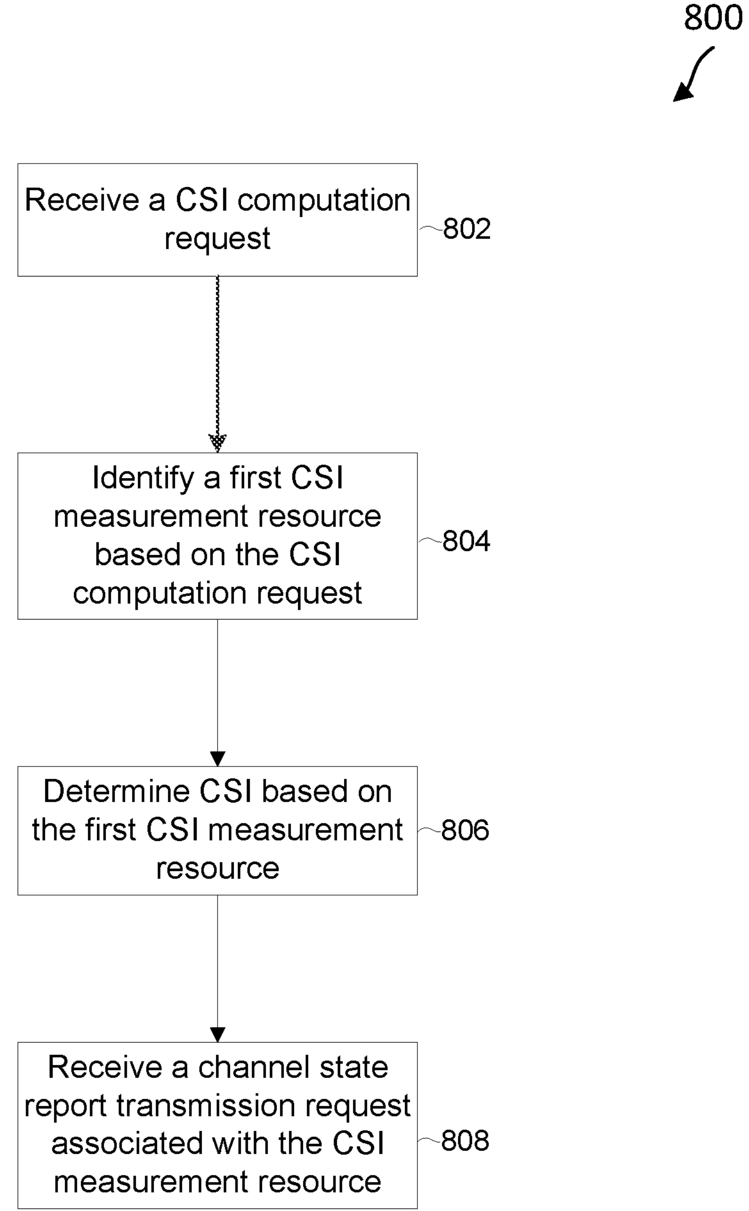
FIG. 8 is a flow diagram of wireless communication according to some aspects of the present disclosure.

FIG. 8 is a flow diagram of wireless communication method 800 according to some aspects of the present disclosure. Aspects of the method 800 can be executed by a computing device (e.g., a processor, processing circuit, and/or other suitable component) of a wireless communication device or other suitable means for performing the steps. For example, a wireless communication device, such as the UE 115 or 700, may utilize one or more components, such as the processor 702, the memory 704, the channel state module 708, the transceiver 710, the modem 712, and the one or more antennas 716, to execute the steps of method 800. The method 800 may employ similar mechanisms as in the method 300, the sequence 400, and the method 500 as described above with respect to FIGS. 3-5. As illustrated, the method 800 includes several enumerated steps, but aspects of the method 800 may include additional steps before, after, and in between the enumerated steps. In some aspects, one or more of the enumerated steps may be omitted or performed in a different order.

At block 802, the UE 115 may receive, from a BS 105, a CSI computation request. The UE 115 may receive the CSI computation request as a downlink control information (DCI) message in the PDCCH (also referred to herein as a compute-only DCI), and the CSI computation request may not include any grant of UL resources for transmission of the CSI report. In other words, the CSI computation request may not include any scheduling information for transmitting the CSI report. In some instances, the UE 115 may utilize one or more components, such as the processor 702, the memory 704, the channel state module 708, the transceiver 710, the modem 712, and the one or more antennas 716 to perform aspects of the block 802.

At block 804, the UE 115 may identify a first CSI measurement resource based on the CSI computation request. The first CSI measurement resource may include a CSI-RS (e.g., an NZP CSI-RS) and/or CSI-IM resource. The UE 115 may receive, from the BS, a configuration for the first CSI measurement resource as part of the CSI computation request, or independently. In some instances, the UE 115 may utilize one or more components, such as the processor 702 and the channel state module 708 to perform aspects of the block 802.

At block 806, the UE 115 may determine CSI based on the first CSI measurement resource. The UE 115 may perform channel and/or interference measurement to determine the CSI. In some instances, the UE 115 may store the resulting CSI in memory (e.g., memory 704) within the UE 115. Afterwards, the UE 115 may continue to transmit other types of uplink data (e.g., URLLC data). For example, the UE 115 may receive a scheduling grant from the BS 105 and may transmit uplink data based on the scheduling grant. In some instances, the UE 115 may keep multiple CSIs stored in its memory corresponding to different CSI computation requests and CSI measurement resources. For example, before the CSI measurement resource, UE 115 may have received an indication of a second CSI measurement resource. The UE 115 may have performed channel estimation and/or interference measurement based on the second CSI measurement resource and stored the resulting CSI in memory. The UE 115 may store and maintain multiple CSIs in its memory. In some instances, there may be a limit to the number of CSIs the UE 115 may store, and the UE 115 may delete a stored CSI or not store a newly computed CSI if the number of CSIs in memory exceeds the limit. In some instances, the UE 115 may utilize one or more components, such as the processor 702, the memory 704, and the channel state module 708 to perform aspects of the block 806.

At block 808, the UE 115 may receive, from the BS 105 (e.g., as a DCI message on the PDDCH), a channel state report transmission request associated with the CSI measurement resource. In an example, the channel state report transmission request (e.g., report-only DCI) includes a CSI request field including a value that maps to a CSI triggering state. The CSI triggering state may be associated with one or more CSI report configurations. Each CSI report configuration may reference a CSI measurement resource the BS 105 is requesting for the report. The channel state report transmission request may indicate that the UE 115 should transmit a report including the CSI it computed based on the CSI measurement resource. The CSI report transmission request may indicate which uplink resources (e.g., PUSCH resources) the UE 115 should use when transmitting the report. The UE 115 may then transmit a channel state report including CSI to the BS 105.

In some instances, the UE 115 may employ a timer as described in method 500 (illustrated in FIG. 5) to determine which, if any, stored CSI to transmit to the BS 105 in response to the CSI report transmission request. For example, the UE 115 may start (or reset) a timer after some period (or duration) has elapsed from the end time of the first CSI measurement resource (e.g., the end of the last symbol of the CSI measurement resource). The period may be (approximately) the minimum gap from the end time of a last symbol of the first CSI measurement resource or the end time of a PDCCH (or CORESET) carrying the CSI computation request to the beginning time of an earliest symbol of a PDCCH (or CORESET) that may carry a CSI report transmission request, for example, as shown in equation (1) discussed above with reference to FIG. 3. The timer duration may be pre-configured (e.g., to a value defined in a 3GPP specification). Alternately, the timer value could be indicated by the BS 105 (e.g., through RRC signaling) or configured by the BS 105 (e.g., as part of the CSI computation request). The timer duration may be based on the information the UE 115 is to include in the CSI report (e.g., the timer duration may be greater when the UE is to include more information in the CSI report). The timer duration may also be based on a codebook type, a number of antenna ports, a channel quality indicator (CQI) type, and/or a precoding matrix indicator (PMI) type associated with a CSI report.

The period of time for which the timer is running may correspond to the period of time for which the current CSI report should be transmitted to the BS 105 in response to receiving the CSI report transmission request. For example, if the CSI report transmission request arrives while the timer is running, the UE 115 may transmit the most recently computed CSI (i.e., based on the first CSI measurement resource) in the CSI report. However, if the UE 115 receives the CSI report transmission request before the timer has started, it may be that the UE 115 has not been able to complete the requested channel and/or interference measurement. If the CSI report transmission request is received after the timer has expired, it may indicate that the most-recently computed CSI data is now stale. In either case—when the CSI transmission request is received before the timer starts or after the timer is expired—the UE 115 may transmit CSI that is not current (e.g., previously stored) CSI. For example, the UE 115 may transmit the CSI determined with respect to the second (earlier) CSI measurement resource, rather than the most recent (later) first CSI measurement resource.

The UE 115 may also transmit placeholder data in the CSI report rather than actual CSI. Transmitting an older CSI or placeholder data may be appropriate when, for example, the transmission on which the CSI transmission request arrived also included a grant for transmitting UL-SCH data or HARQ acknowledgements. Alternately, the UE 115 may ignore the CSI report transmission request altogether (i.e., refrain from transmitting a CSI report), for example, if the CSI transmission request only included a grant for transmitting the CSI report. In some instances, the UE 115 may also remove a stored CSI from memory based on the timer expiring (since there is no CSI report transmission request received for the CSI). In some instances, the UE 115 may utilize one or more components, such as the processor 702, the memory 704, the channel state module 708, the transceiver 710, the modem 712, and the one or more antennas 716 to perform aspects of the block 808.

Figure 9:
FIG. 9 is a flow diagram of wireless communication according to some aspects of the present disclosure.
Figure 9:
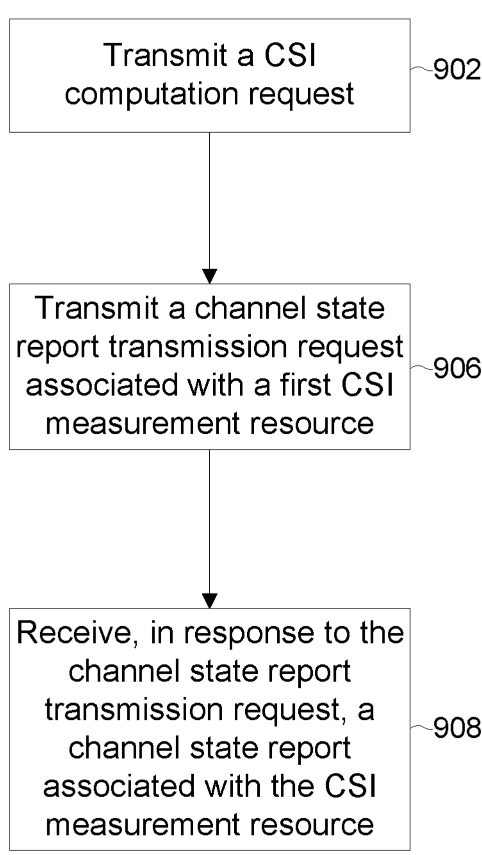

FIG. 9 is a flow diagram of wireless communication method 900 according to some aspects of the present disclosure. Aspects of the method 900 can be executed by a computing device (e.g., a processor, processing circuit, and/or other suitable component) of a wireless communication device or other suitable means for performing the steps. For example, a wireless communication device, such as the BS 105 or 600, may utilize one or more components, such as the processor 602, the memory 604, the channel state module 608, the transceiver 610, the modem 612, and the one or more antennas 616, to execute the steps of method 900. The method 900 may employ similar mechanisms as in the method 300, the sequence 400, and the method 500 as described above with respect to FIGS. 3-5. As illustrated, the method 900 includes several enumerated steps, but aspects of the method 900 may include additional steps before, after, and in between the enumerated steps. In some aspects, one or more of the enumerated steps may be omitted or performed in a different order.

At block 902, the BS 105 may transmit a CSI computation request to the UE 115. The BS 115 may transmit the CSI computation request as a downlink control information (DCI) message in the PDCCH (also referred to herein as a compute-only DCI), and the CSI computation request may not include any grant of UL resources for transmission of the CSI report by the UE 115. In other words, the CSI computation request may not indicate any scheduling information or resources for transmitting the CSI report. In some embodiments, the CSI computation request may include a configuration of a first CSI measurement resource, which may include CSI-RS (e.g., NZP CSI-RS) or CSI-IM resources. In some embodiments, the BS 105 may transit to the UE 115 a configuration for the first CSI measurement resource separately. In some instances, the BS 105 may utilize one or more components, such as the processor 602, the memory 604, the channel state module 608, the transceiver 610, the modem 612, and the one or more antennas 616, to perform aspects of the block 902.

At block 906, the BS 105 may transmit, to the UE 115 (e.g., as a DCI message on the PDDCH), a channel state report transmission request associated with the first CSI measurement resource. In an example, the channel state report transmission request (e.g., report-only DCI) includes a CSI request field including a value that maps to a CSI triggering state. The CSI triggering state may be associated with one or more CSI report configurations. Each CSI report configuration may reference a CSI measurement resource the BS 105 is requesting for the report. The CSI measurement resource referenced by the CSI report transmission request may correspond to the first CSI measurement resource referenced by the CSI computation request. The channel state report transmission request may indicate that the UE 115 should transmit a report including CSI it computed based on the first CSI measurement resource. The CSI report transmission request may indicate which uplink resources (e.g., PUSCH resources) the UE 115 should use when transmitting the report. In some instances, the BS 105 may transmit the channel state report transmission request after a first duration has elapsed from the end time of the first CSI measurement resource (e.g., from the end of the last symbol of the CSI measurement resource). The first duration may be based on a CSI computation timeline, as described with respect to FIG. 3. In some instances, the BS 105 may also indicate to the UE 115 a configuration for a duration of a timer for associating the CSI report to the first CSI measurement resource (e.g., via RRC signaling, or as part of the CSI computation request). The timer duration may be based on the information to be included in the CSI report (e.g., the timer duration may be greater when more information is to be in the CSI report). The timer duration may also be based on a codebook type, a number of antenna ports, a channel quality indicator (CQI) type, and/or a precoding matrix indicator (PMI) type associated with a CSI report. In some instances, the BS 105 may utilize one or more components, may utilize one or more components, such as the processor 602, the memory 604, the channel state module 608, the transceiver 610, the modem 612, and the one or more antennas 616, to perform aspects of the block 904.

At block 908, the BS 105 may receive (e.g., on the PUSCH, using resources indicated by the BS 105 in the channel state report transmission request), in response to the channel state report transmission request, a channel state report associated with the first CSI measurement resource. In some aspects, the channel state report may instead be associated with a different CSI measurement resource. For example, the BS 105 may indicate to the UE 115 a second CSI measurement resource before the first CSI measurement resource. Depending on when the BS 115 transmits the CSI report transmission request, the channel state report may instead be based on the second CSI measurement resource. For example, if the UE 115 receives the CSI report transmission request while a timer (e.g., the timer described in FIG. 5, which may be configured by the BS 105 as discussed with respect to block 906) is running, the channel state report may be based on the first CSI measurement resource. However, if the CSI report transmission request is received by the UE 115 before the timer is started (possibly too early for the UE 115 to finish determining the CSI) or after the timer expires (possibly when the CSI is stale), the BS 105 may instead receive a CSI report based on the second CSI measurement resource, or placeholder data. This may be the case when, for example, the BS 105 included a grant for transmitting UL-SCH data or HARQ acknowledgements along with the grant for transmitting the CSI report. In some instances, the BS 105 may not receive a CSI report at all, for example, if the BS 105 scheduled uplink resources only for the CSI report.

In some instances, the BS 105 may transmit to the UE 115 a scheduling grant after the CSI computation request and before the CSI report transmission request. The BS 115 may then receive an uplink transmission (e.g., a transmission associated with URLLC data) from the UE 115 on based on the scheduling grant.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a user equipment (UE), comprising:

receiving, from a network entity, a channel state information (CSI) computation request that indicates a first CSI measurement resource;

determining, based on the first CSI measurement resource, CSI;

starting, after a first duration has elapsed from an end time of the first CSI measurement resource, a timer, wherein the timer is configured to define a window during which the UE expects to receive a CSI report transmission request and to determine whether to transmit the CSI based on whether the CSI report transmission request is received within the window; and receiving, from the network entity after the CSI computation request, the CSI report transmission request that requests transmission of the CSI determined using the first CSI measurement resource.

2. The method of claim 1, wherein the receiving the CSI computation request comprises:

receiving, from the network entity, the CSI computation request comprising a configuration of the first CSI measurement resource.

3. The method of claim 1, further comprising:

performing at least one of:

transmitting, to the network entity, the CSI report including the CSI determined using the first CSI measurement resource, in response to the CSI report transmission request, based on the CSI report transmission request being received while the timer is in progress; or refraining from transmitting the CSI report based on the CSI report transmission request being received before the timer is started or after the timer expires.

4. The method of claim 3, wherein the end time of the first CSI measurement resource is an end of a last symbol of the first CSI measurement resource.

5. The method of claim 3, further comprising:

receiving, from the network entity, an indication of a second CSI measurement resource earlier than the first CSI measurement resource; and transmitting, to the network entity in response to the CSI report transmission request, another CSI report including CSI determined using the second CSI measurement resource based on the CSI report transmission request being received before the timer is started or after the timer expires.

6. The method of claim 3, wherein a duration of the timer is based on information to be included in the CSI report based on the CSI.

7. The method of claim 1, wherein:

the receiving the CSI computation request comprises:

receiving first downlink control information (DCI) including the CSI computation request; and the receiving the CSI report transmission request comprises:

receiving second DCI including the CSI report transmission request.

8. The method of claim 1, further comprising:

receiving, from the network entity after the CSI computation request and before the CSI report transmission request, a scheduling grant; and transmitting, to the network entity, an uplink data transmission based on the scheduling grant.

9. The method of claim 8, wherein the uplink data transmission is associated with an ultra-reliable low-latency communication (URLLC).

10. A method of wireless communication performed by a network entity, comprising:

transmitting, to a user equipment (UE), a channel state information (CSI) computation request that indicates a first CSI measurement resource;

transmitting, to the UE, a CSI report transmission request that requests transmission of CSI determined using the first CSI measurement resource, wherein the CSI report transmission request is associated with a window during which the UE expects to receive the CSI report transmission request and determine whether to transmit the CSI based on whether the CSI report transmission request is received within the window, and wherein the window is defined by a timer started after a first duration has elapsed from an end time of the first CSI measurement resource; and receiving, from the UE and based on the CSI report transmission request being received during the window, a CSI report including the CSI determined using the first CSI measurement resource.

11. The method of claim 10, wherein the transmitting the CSI computation request comprises:

transmitting, to the UE, the CSI computation request comprising a configuration of the first CSI measurement resource.

12. The method of claim 10, further comprising:

transmitting, to the UE, a configuration for the first CSI measurement resource.

13. The method of claim 10, wherein the transmitting the CSI report transmission request comprises:

transmitting, after a first duration has elapsed from an end time of the first CSI measurement resource, the CSI report transmission request.

14. The method of claim 13, wherein the end time of the first CSI measurement resource is an end of a last symbol of the first CSI measurement resource.

15. The method of claim 10, further comprising:

transmitting, to the UE, a configuration for a duration of a timer for associating the CSI report to the first CSI measurement resource.

16. The method of claim 15, further comprising:

determining the duration of the timer based on information to be included in the CSI report based on the CSI determined using the first CSI measurement resource.

17. The method of claim 10, further comprising:

transmitting, to the UE, an indication of a second CSI measurement resource earlier than the first CSI measurement resource; and receiving, from the UE in response to the CSI report transmission request, another CSI report including CSI determined using the second CSI measurement resource.

18. The method of claim 10, wherein:

the transmitting the CSI computation request comprises:

transmitting first downlink control information (DCI) including the CSI computation request; and the transmitting the CSI report transmission request comprises:

transmitting second DCI including the CSI report transmission request.

19. A user equipment (UE), comprising:

one or more transceivers configured, individually or collectively, to:

receive, from a network entity, a channel state information (CSI) computation request that indicates a first CSI measurement resource; and one or more processors configured, individually or collectively, to:

determine, based on the first CSI measurement resource, CSI; and start, after a first duration has elapsed from an end time of the first CSI measurement resource, a timer, wherein the timer is configured to define a window during which the UE expects to receive a CSI report transmission request and to determine whether to transmit the CSI based on whether the CSI report transmission request is received within the window, wherein the one or more transceivers are further configured, individually or collectively, to:

receive, from the network entity after the CSI computation request, the CSI report transmission request that requests transmission of the CSI determined using the first CSI measurement resource.

20. The UE of claim 19, wherein the one or more transceivers configured to receive the CSI computation request are further configured, individually or collectively, to:

receive, from the network entity, the CSI computation request comprising a configuration of the first CSI measurement resource.

21. The UE of claim 19, wherein the one or more transceivers are further configured, individually or collectively, to:

receive, from the network entity, a configuration for the first CSI measurement resource.

22. The UE of claim 19, wherein the one or more transceivers are further configured, individually or collectively, to:

transmit, to the network entity in response to the CSI report transmission request, a CSI report including the CSI determined using the first CSI measurement resource.

23. The UE of claim 19, wherein the end time of the first CSI measurement resource is an end of a last symbol of the first CSI measurement resource.

24. The UE of claim 19, further comprising one or more memories, wherein:

the one or more processors are further configured, individually or collectively, to:

store, at the one or more memories, the determined CSI; and the one or more transceivers are further configured, individually or collectively, to:

transmit, to the network entity in response to the CSI report transmission request, the CSI report including the stored CSI based on the CSI report transmission request being received while the timer is in progress.

25. The UE of claim 19, wherein the one or more processors are further configured, individually or collectively, to:

refrain from transmitting the CSI report based on the CSI report transmission request being received before the timer is started or after the timer expires.

26. The UE of claim 19, wherein the one or more transceivers are further configured, individually or collectively, to:

receive, from the network entity, an indication of a second CSI measurement resource earlier than the first CSI measurement resource; and transmit, to the network entity in response to the CSI report transmission request, another CSI report including CSI determined using the second CSI measurement resource based on the CSI report transmission request being received before the timer is started or after the timer expires.

27. A network entity, comprising:

one or more processors; and one or more transceivers, coupled to the one or more processors, configured, individually or collectively, to:

transmit, to a user equipment (UE), a channel state information (CSI) computation request that indicates a first CSI measurement resource;

transmit, to the UE after the CSI computation request, a CSI report transmission request that requests transmission of CSI determined using the first CSI measurement resource, wherein the CSI report transmission request is associated with a window during which the UE expects to receive the CSI report transmission request and determine whether to transmit the CSI based on whether the CSI report transmission request is received within the window, and wherein the window is defined by a timer started after a first duration has elapsed from an end time of the first CSI measurement resource; and receive, from the UE and based on the CSI report transmission request being received during the window, a CSI report including the CSI.

28. The network entity of claim 27, wherein the one or more transceivers configured to transmit the CSI computation request are further configured, individually or collectively, to:

transmit, to the UE, the CSI computation request comprising a configuration of the first CSI measurement resource.

29. The network entity of claim 27, wherein the one or more transceivers are further configured, individually or collectively, to:

transmit, to the UE, a configuration for the first CSI measurement resource.

30. The network entity of claim 27, wherein the one or more transceivers configured to transmit the CSI report transmission request are further configured, individually or collectively, to:

transmit, after a first duration has elapsed from an end time of the first CSI measurement resource, the CSI report transmission request.

31. The network entity of claim 30, wherein the end time of the first CSI measurement resource is an end of a last symbol of the first CSI measurement resource.

32. A user equipment (UE), comprising:

means for receiving, from a network entity, a channel state information (CSI) computation request that indicates a first CSI measurement resource;

means for determining, based on the first CSI measurement resource, CSI;

means for starting, after a first duration has elapsed from an end time of the first CSI measurement resource, a timer, wherein the timer is configured to define a window during which the UE expects to receive a CSI report transmission request and to determine whether to transmit the CSI based on whether the CSI report transmission request is received within the window; and means for receiving, from the network entity after the CSI computation request, the CSI report transmission request that requests transmission of the CSI determined using the first CSI measurement resource.

33. The UE of claim 32, wherein:

the means for receiving the CSI computation request comprise:

means for receiving first downlink control information (DCI) including the CSI computation request; and the means for receiving the CSI report transmission request comprise:

means for receiving second DCI including the CSI report transmission request.

34. The UE of claim 32, further comprising:

means for receiving, from the network entity after the CSI computation request and before the CSI report transmission request, a scheduling grant; and means for transmitting, to the network entity, an uplink data transmission based on the scheduling grant.

* * * * *